(12) United States Patent
Li

(10) Patent No.: US 12,244,758 B2
(45) Date of Patent: Mar. 4, 2025

(54) SYSTEMS AND METHODS FOR PROCESSING CALLS

(71) Applicant: Comcast Cable Communications, LLC, Philadelphia, PA (US)

(72) Inventor: Chia-Chang Li, Holmdel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/333,270

(22) Filed: Jun. 12, 2023

(65) Prior Publication Data

US 2023/0403355 A1 Dec. 14, 2023

Related U.S. Application Data

(63) Continuation of application No. 16/781,790, filed on Feb. 4, 2020, now Pat. No. 11,722,595.

(60) Provisional application No. 62/800,923, filed on Feb. 4, 2019.

(51) Int. Cl.
*H04L 12/66* (2006.01)
*H04L 65/1069* (2022.01)
*H04L 65/1096* (2022.01)
*H04L 65/1104* (2022.01)
*H04M 3/22* (2006.01)
*H04M 7/00* (2006.01)

(52) U.S. Cl.
CPC ...... *H04M 3/2281* (2013.01); *H04L 65/1069* (2013.01); *H04L 65/1096* (2013.01); *H04L 65/1104* (2022.05); *H04M 7/0078* (2013.01)

(58) Field of Classification Search
CPC .. H04M 3/42153; H04M 15/47; H04M 15/58; H04M 15/72; H04M 15/755; H04M 15/8214; H04M 3/2218; H04M 3/2263; H04M 3/42357; H04M 15/721; H04M 15/8221; H04M 15/83; H04M 3/42042; H04M 3/436; H04M 3/42059; H04M 7/0078; H04L 45/22; H04L 65/1016; H04L 65/1006; H04L 65/1069; H04L 63/08; H04L 63/126; H04L 12/1895; H04L 65/1073; H04L 65/105; H04L 65/1046; H04L 63/0869; H04L 65/1079; H04L 69/22
USPC ............ 726/4, 2, 22; 379/114, 14; 709/229, 709/206, 228; 370/352, 351, 356
See application file for complete search history.

(56) References Cited

U.S. PATENT DOCUMENTS

| | | | |
|---|---|---|---|
| 9,386,148 B2 | 7/2016 | Farrand et al. | |
| 9,485,099 B2 | 11/2016 | Fu et al. | |
| 9,667,775 B1 * | 5/2017 | Haltom | H04M 3/2281 |
| 9,706,048 B2 | 7/2017 | Russell | |
| 10,110,741 B1 | 10/2018 | Cohen et al. | |
| 10,581,829 B1 | 3/2020 | Don et al. | |

(Continued)

OTHER PUBLICATIONS

US Patent Application filed Feb. 4, 2020, entitled "Systems and Methods for Processing Calls", U.S. Appl. No. 16/781,790.

*Primary Examiner* — Kharye Pope
(74) *Attorney, Agent, or Firm* — BakerHostetler

(57) ABSTRACT

Methods and systems are described for authenticating calls. An example method may comprise receiving a message indicative of a call request. Header data associated with the message may be analyzed to determine an attestation value. A signature may be generated based on the attestation value. A signed message comprising the signature and at least a portion of the message may be sent.

36 Claims, 11 Drawing Sheets

(56) References Cited

U.S. PATENT DOCUMENTS

| | | | |
|---|---|---|---|
| 2003/0214165 A1 | 11/2003 | Finner et al. | |
| 2004/0177048 A1* | 9/2004 | Klug | H04L 51/226 |
| | | | 705/401 |
| 2008/0096553 A1* | 4/2008 | Saksena | H04W 28/06 |
| | | | 455/426.2 |
| 2009/0006844 A1 | 1/2009 | Wing et al. | |
| 2010/0082977 A1 | 4/2010 | Boyle et al. | |
| 2010/0262704 A1* | 10/2010 | Bakker | H04L 65/403 |
| | | | 709/229 |
| 2011/0265153 A1* | 10/2011 | Guccione | H04L 63/08 |
| | | | 726/5 |
| 2013/0128879 A1* | 5/2013 | Kyle | H04L 65/1069 |
| | | | 370/352 |
| 2013/0251123 A1* | 9/2013 | Tirunagari | H04M 3/533 |
| | | | 379/88.22 |
| 2014/0341210 A1* | 11/2014 | LaCroix | H04L 45/22 |
| | | | 370/352 |
| 2018/0288060 A1 | 10/2018 | Jackson et al. | |
| 2019/0081991 A1* | 3/2019 | Murugesh | H04L 65/1069 |
| 2020/0028690 A1* | 1/2020 | Barakat | H04L 9/3247 |
| 2020/0053136 A1* | 2/2020 | Filart | H04L 65/1096 |
| 2020/0053568 A1* | 2/2020 | Filart | H04L 63/1466 |
| 2022/0182490 A1* | 6/2022 | Anand | H04M 3/42059 |

\* cited by examiner

SYSTEMS AND METHODS FOR PROCESSING CALLS

RELATED APPLICATIONS

This application is a continuation of U.S. patent application Ser. No. 16/781,790, filed Feb. 4, 2020, now U.S. Pat. No. 11,722,595, issued Aug. 8, 2023, which claims the benefit of U.S. Patent Application No. 62/800,923, filed Feb. 4, 2019, which are hereby incorporated by reference for any and all purposes.

BACKGROUND

Unwanted solicitation and/or scam phone calls are a problem. Often, callers of such unwanted calls conceal an originating number and/or caller identifier (e.g., spoof, etc.). To prevent such unwanted calls, service providers may take action (e.g., flag, drop, refuse to authenticate/sign, etc.) against calls with spoofed information. However, legitimate reasons to initiate a call with spoofed information do exist. Phone calls from an end-user system, such as a PBX, may have real or spoofed calling number information. Current solutions do not take into account legitimate reasons to initiate a call with spoofed information, and do not adequately take action on unwanted or scam phone calls. Thus, improvements are needed.

SUMMARY

Methods and systems are disclosed for authenticating information associated with a message. The methods and systems may be implemented by an origination phone service provider to authenticate a calling number associated with the message. The message may be associated with a media session, such as a call, audio call, video call, multimedia communication session, and/or the like. The message may comprise a sender identifier indicative of a caller (e.g., or originator) that generated the message. In some scenarios, the sender identifier may be inauthentic (e.g., invalid) because the caller is attempting to hide the identity of the caller. The message may have originated outside of the network tasked with forwarding the message to a destination associated with the message. To determine authenticity (e.g., validity, trustworthiness) of the message, a computing device may be configured to analyze header data, such as data associated one or more header fields, headers, and/or the like.

A diversion header, an identity header, or a paid header, or a combination thereof may be determined from the header data. An attestation value indicative of authenticity (e.g., trustworthiness, validity) of the sender identifier may be determined based on the header data. The presence or absence of a diversion header, identity header, and/or paid header may be determined. Values within the diversion header, identity header, or paid header may be determined. The presence of the any of these headers, absence of any of these headers, the values of any of these headers, a combination thereof, and/or the like may be used to determine an attestation value. The attestation value may be used to generate a signature or otherwise used to generate an updated message. The updated message may be sent, based on a destination identifier associated with the message, to another computing device (e.g., network device, router, user device, destination device).

Inbound calls may be received and processed according to one or more intercept criteria. A message associated with an inbound call may be forked to multiple termination points. One of the termination points may determine, using the one or more intercept criteria, whether to intercept the call. If the one or more intercept criteria are satisfied, then the call may be intercepted. Interception of the call may simulate a pickup and/or hang up of the call, result in cancelation of the call to the other termination points.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
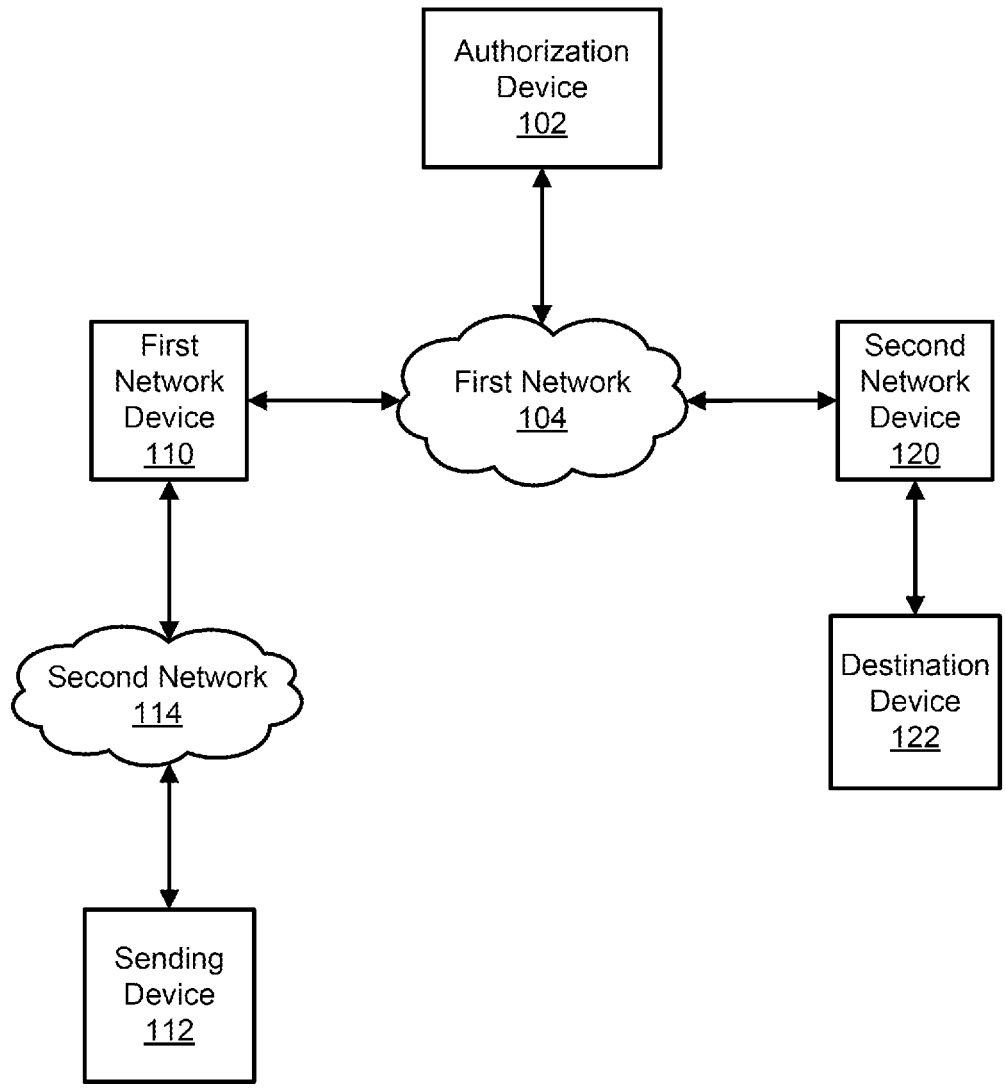
FIG. 1 is a block diagram illustrating an example environment.

Disclosed are systems and methods for authenticating information of a communication session. The communication session may comprise one or more types of communication, such as text, images, video, audio, secure or encrypted communication, streaming, multimedia messaging service, a call, a conference session, a combination thereof, and/or the like. The systems and/or methods described herein may be implemented by one or more devices on a network. A first device may send a data indicative of a communication session (e.g., a request to initiate a communication session). The communication session may be a communication session between the first device and a second device. The communication session may be implemented by routing data associated with the communication session across one or more networks. The first device may send the data with false identification information. One or more computing devices in the network may use the presently disclosed techniques to determine a level of trustworthiness for identification information. The level of trustworthiness may be inserted into a message of the communication session by applying a signature.

The signature may identify the computing device that determined the level of trust. The presence or absence of header data may be used to determine the level of trustworthiness. The header data may indicate and/or be associated with different sources that are trusted and/or untrusted. The header data may indicate that information in a message of the communication session has been changed. If one or more header fields are present in or absent from the message, this may be indicative of a source of the message. The presence of a diversion header and the absence of an identify header may indicate that the message has a lower level of trustworthiness. The presence of both the identity header and diversion header may be indicative of a higher level of trustworthiness. One or more rules may associate the presence of header data, the absence of header data, and/or a combination of the presence of some header data and the absence of other header data with corresponding attestation values indicating different levels of trustworthiness of the message.

A communication session may comprise information associated with an originator and/or sender of a communication request. The systems and/or methods described herein may be implemented on one or more computing devices within a telecommunications network, or any generic network. If a communication session (e.g., call) is initiated, a message may be generated at a sending device (e.g., telephone, computer, tablet, server, mobile device, smart device, computing station, computing node) originating the call. The message may be routed via the network to cause a network connection between the sending device originating the communication session and the destination device (e.g., telephone, computer, tablet, server, mobile device, smart device, computing station, computing node).

A bad actor, such as a spammer, may conceal information related to a communication session, such as a phone number and/or a caller identifier (caller id) associated with a sending device initiating the communication session. Concealing information related to a communication session may be called spoofing. One or more service providers (or other entities) may authenticate (e.g., authorize, approve, verify, validate) messages of a communication sessions to ensure the communication session are not spoofed. Authenticating communication session may comprise using a private key to apply a signature to a message or a portion of a message.

A certificate management system may store encryption keys, tokens, certificates, and/or the like that may be used by service providers. A unique private key may be assigned to each service provider. Each private key may have an associated public key. Each service provider may have access to every public key. A first service provider may receive a message that was sent by a second service provider. The message may comprise a signature associated with (e.g., added by) the second service provider. The first service provider may verify the signature using a public key associated with the second service provider.

A particular service provider may deploy one or more computing devices within a network associated with the particular service provider. The one or more computing devices may receive a message generated by a sending device originating a communication session. The one or more computing devices may examine header data, such as one or more header fields. Depending on the header data determined, an attestation value may be associated with the message. The attestation value may indicate a level of authenticity (e.g., trustworthiness, expected validity) of an identifier associated with a sender. The header data may be determined as part of a communication session initiation sequence. After the communication session initiation sequence is complete, messages associated with a particular communication session may be forwarded (e.g., without analysis to determine the trustworthiness of the sender identifier).

The one or more computing devices may receive a message related to a communication session (e.g., a request to initiate a call). The one or more computing devices may determine a presence or absence of a first header associated with the message. The first header may comprise a diversion header. The one or more computing devices may determine a presence or absence of a second header associated with the message. The second header may comprise an identity header. The presence or absence of a third header associated with the message may also be determined. The third header may comprise a P-Asserted-Identity (PAID) header. Although the terms first, second, and third are used to represent headers, it should be understood that the headers may be in an order and/or be determined in any order.

Certain combinations of the presence or absence of headers may be associated with different levels of trustworthiness and/or attestation values. The attestation value may comprise full attestation, partial attestation, gateway attestation, and/or other appropriate values. The presence of the first header, the second header, and the third header may be associated with full attestation. The presence of the first header and the third header in combination with the absence of the second header may be associated with a partial attestation. The absence of the first header and second header in combination with the presence of the third header may be associated with a full attestation. If presence or absence of one or more of the first header, the second header, or the third header indicates an error, then the one or more computing devices may route the message without signing (e.g., authorizing, authenticating, etc.) the message or any portion of the message. The first header, second header, and/or third header may also be checked for formatting, presence of certain data values, and/or other information to determine an attestation value. The message may be signed using the determined attestation and sent to a computing device (e.g., for routing to the destination).

The message may be received by a computing device. The computing device may be associated with the first service provider or a second service provider. The receiving computing device may cause appropriate action to be taken. If the message does not comprise a signature, the receiving computing device may drop (e.g., ignore, discard, delete) the message or the receiving computing device may cause a warning to be displayed (e.g., or output) at a destination device. If the message comprises a signature indicating full attestation, the receiving computing device may cause a call associated with the message to connect and proceed normally (e.g., display a caller id if there is any, etc.). If the message comprises a signature indicating an attestation value less than full attestation, the receiving computing device may cause a call associated with the message to connect and a warning and/or message to be displayed (e.g., or output) at a destination device.

FIG. 1 is a block diagram showing an example environment. The example environment may comprise an authentication device 102, a first network 104, a first network device 110, a sending device 112, a second network 114, a second network device 120, a destination device 122, a combination thereof, and/or the like.

The authentication device 102 may comprise one or more computing devices. The authentication device 102 may be configured to manage (e.g., store, generate, determine) digital identification information. The authentication device 102 may comprise a certificate authority (e.g., a certificate management device, certificate management system). The authentication device 102 may manage (e.g., store, create, determine) private key/public key pairs. A message or a portion of a message signed (e.g., encrypted, etc.) by a private key may be verified (e.g., decrypted, etc.) using a public key associated with the private key. Each private key may be associated with a unique service provider. Each private key may be associated with a particular computing device.

The first network 104 may comprise a public portion, such as the Internet. The first network 104 may comprise a private portion. The first network 104 may comprise a variety of network devices, such as routers, servers, etc. for facilitating communication between two or more computing devices. The first network 104 may comprise one or more messaging protocols. The one or more messaging protocols may comprise formatting and messaging rules for messages sent via the first network 104. The first network 104 may facilitate communication between a network device associated with a first service provider and a network device associated with a second service provider.

The first network device 110 may comprise one or more computing devices. The first network device 110 may be associated with a first service provider. The first network device 110 may comprise a Secure Telephone Identity Authentication Service (STI-AS). The first network device 110 may receive a private key associated with the first service provider from the authentication device 102 via the first network 104.

The sending device 112 may comprise a user device, such as a landline telephone, a smart phone, a desktop, a laptop, a portable computing device, a mobile computing device, a stationary computing device, a wearable computing device, etc. The sending device 112 may comprise and/or be associated with a sender identifier. The sender identifier may comprise a number, such as a phone number. The sender identifier may comprise an address, such as a media access control address (MAC address) and/or an Internet Protocol address (IP address). The sending device 112 may be associated with an entity, such as a subscriber to a service. The sending device 112 may be associated with an enterprise voice system associated with the entity. The sending device 112 may be associated with a failover service associated with the entity. The sending device 112 may be associated with a private branch exchange (PBX) associated with the entity. The private branch exchange may comprise a plurality of user devices that communicate via a local network (e.g., telephone trunk or other network). The private branch exchange may comprise a computing device (e.g., a server) that manages communication sessions for the user devices. The computing device may manage communication that is internal and/or external to the PBX. The computing device located in a PBX may send messages from the sending device 112 to the second network 114, the first network device 110, and/or any other computing device.

The second network 114 may be associated with the entity. The second network 114 may comprise an enterprise voice system associated with the entity. The second network 114 may be associated with a failover service associated with the entity. The second network 114 may comprise a PBX associated with the entity. A computing device associated with the PBX may send messages from the sending device 112 to the second network 114, the first network device 110, and/or any other computing device. The second network 114 may comprise a public portion, such as the Internet. The second network 114 may comprise a private portion, associated with the entity. The second network 114 may comprise a variety of network devices, such as routers, servers, etc. for facilitating communication between two of more computing devices. The second network 114 may comprise one or more messaging protocols. The one or more messaging protocols comprise formatting and messaging rules for messages sent via the second network 114. The second network 114 may facilitate communication between a sending device and a network device.

The sending device 112 may receive input from a user. The input may cause the sending device 112 to initiate a communication with the destination device 122. The sending device 112 may cause the message to be transmitted (e.g., to the first network device 110, via the second network 114, to the second network device 120, to the destination device 122). The message may comprise a number, name, and/or address associated with the sending device 112. The sending device 112 and/or a device within the second network 114 may cause the message to conceal the number, name, and/or address associated with the sending device 112. The message, as created by the sending device 112 or as changed by a device within the second network 114, may comprise a number, name, and/or address associated with a device other than the sending device 112.

A legitimate reason may exist for the sending device 112 and/or a device within the second network 114 to conceal the number, name, and/or address associated with the sending device 112, such as the sending device 112 and/or the second network 114 being associated with an enterprise voice system associated with the entity, a failover service associated with the entity, and/or a PBX associated with the entity. A nefarious reason may exist for the sending device 112 and/or a device within the second network 114 to conceal the number, name, and/or address associated with the sending device 112, such as an attempt to perpetrate a fraud and/or scam.

Header data may be added to the message. The header data may comprise one or more headers, such as a diversion header, identity header, paid header, or other header. The header data may be added by any computing device in a network that receives the message. A computing device in the second network 114 (e.g., or the first network 104) may add header data (e.g., one or more headers) to the message. The computing device may comprise a communication session device, such as a SIP device, a proxy, an edge device, routing device, a combination thereof, and/or the like. The header data may be inserted before the message is received by the first network device 110. A diversion header may be inserted by the computing device if the message is being forwarded to an alternative network for failover (e.g., or load handling) purposes. An identity header may be added to the message by a device that receives the message and is able to authenticate the sending device 112. In some scenarios, a bad actor sending the message may cause the sending device 112 to add false header data.

Information about which devices, sources, networks, service providers, and/or the like add in which type of header data (e.g., and in which scenarios) may allow rules to be generated to determine corresponding attestation values (e.g., or levels of trustworthiness). If a service provider of the sending device 112 does not and/or has not authenticated the message (e.g., has not verified that the sending device is authorized to use the sender identifier), then the message may have no identity header. Some service providers may have implemented protocols that require authentication and adding of identity headers (e.g., to prove authentication), while other service providers may not have implemented authentication or may not use identity headers. If no diversion header is present in a message from an external network, then a service provider (e.g., or computing device thereof) may be able to determine that the message is in error because the service provider may expect messages from an external network (e.g., or a particular network or source) to include diversion headers. The presence of a diversion header may indicate that the message is received from a certain type of external source network or associated with a certain type of service (e.g., failover service, load balancing service, forwarding service).

The first network device 110 may receive the message. The first network device 110 may apply logic (e.g., further described in reference to FIGS. 4-7 or as described elsewhere herein) to determine an attestation value. The first network device 110 may use the private key to apply a signature to the message or a portion of the message if the determined attestation value is full attestation, partial attestation, gateway attestation, etc. The first network device 110 may use the private key to apply a signature to an identity header of the message. The identity header may be generated by the first network device 110 (e.g., and inserted into or added to the message).

The identity header may be generated based on a protocol that defines the format and fields of the identity header. The identity header may comprise one or more of the following data fields: a sender identifier (e.g., calling number), a destination identifier (e.g., called number), timing information (e.g., date and time header generated), attestation (e.g., full attestation, partial attestation, gateway attestation), and an identifier of a computing device adding the identity header (e.g., unique originating identifier). The first network device 110 may generate the identity header by determining values for the data fields. The first network device 110 may encrypt the values using a private key associated with the first network device 110. The resulting encrypted signature (e.g., an encrypted string comprising all the data fields) may be inserted in a header area of the message (e.g., indicated as "identity: [encrypted signature]" where brackets indicates inserted information). Other information may also be inserted into the message, such as an identifier of an encryption protocol used to generate the signature. The first network device 110 may not apply a signature if the determined attestation value is no attestation. The first network device 110 may cause the message to be transmitted (e.g., to the second network device 120, via the first network 104, or to directly to the destination device 122).

The second network device 120 may comprise one or more computing devices. The second network device 120 may be associated with a second service provider. The second network device 120 may comprise a Secure Telephone Identity Verification Service (STI-VS). The second network device 120 may receive a public key associated with the private key associated with the first service provider (e.g., or owner of the first network device) from the authentication device 102 via the first network 104. The public key may be requested from the authentication device 102 based on (e.g., in response to) receiving a message, such as a call request. The public key may be requested from the authentication device 102 based on a field in the message indicating information associated with requesting the public key.

If the message comprises a signature purported to be associated with the first network device 110, the second network device 120 may use the public key associated with the first network device 110 to verify that the first network device 110 applied the signature. The second network device 120 may use the public key to decrypt the identity header of the message. The second network device 120 may determine how to handle the message based on a presence or absence of a verifiable signature and/or an associated attestation value. The second network device 120 (e.g., or other device, such as the first network device 110) may determine not to forward a message with no verifiable signature (e.g., which may cause the call or request for a call to be dropped). If the message comprises no verifiable signature or if the associated attestation value is less than full attestation, the second network device 120 may take one or more protective actions (e.g., causing a notification to be sent to and/or displayed on the destination device 122, etc.) and may cause the message to be forwarded to the destination device 122. The one or more protective actions may comprise causing a notification to be sent to and/or displayed (e.g., or output) on the destination device 122. The notification may indicate that the message sender is unverified, that the message is untrusted, and/or the like. The second network device 120 may forward the message to the destination device 122 with no special protective actions if the message comprises a verifiable signature and the associated attestation value indicates full attestation.

The destination device 122 may comprise a user device, such as a landline telephone, a smart phone, a desktop, a laptop, a portable computing device, a mobile computing device, a stationary computing device, a wearable computing device, etc. The destination device 122 may comprise a number, such as a phone number. The destination device 122 may comprise an address, such as a media access control address (MAC address) and/or an Internet Protocol address (IP address). The destination device 122 may display/output messages (such as warnings, caller ids, sender phone numbers, etc.) based on the message and/or one or more signals received from the second network device 120. A user may reject a communication between the destination device 122 and the sender device 112 by engaging input into the destination device 122. A user may cause a communication between the destination device 122 and the sender device 112 to begin by engaging input into the destination device 122.

Figure 2A:
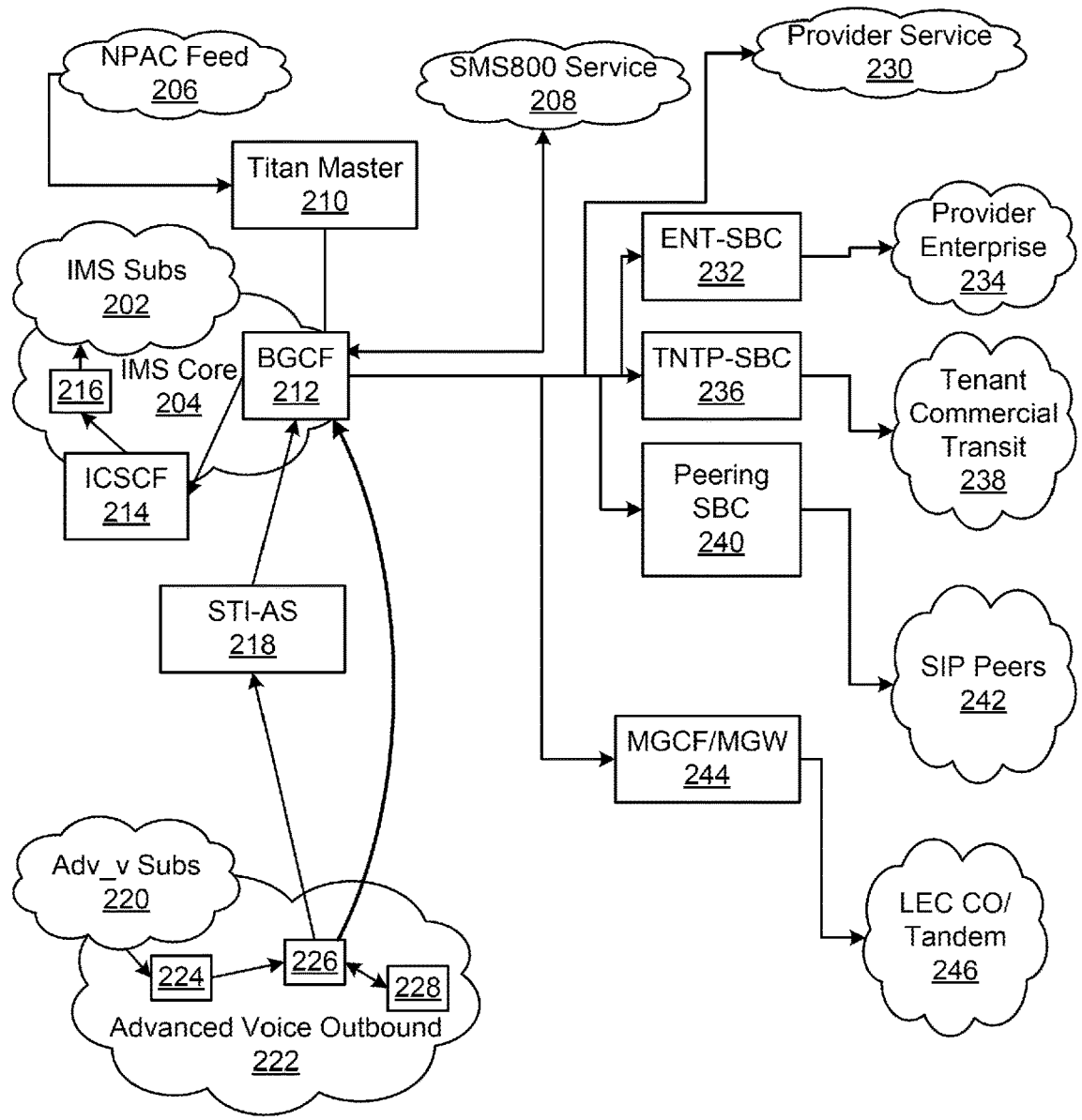
FIG. 2A is a block diagram illustrating an example environment.
Figure 2B:
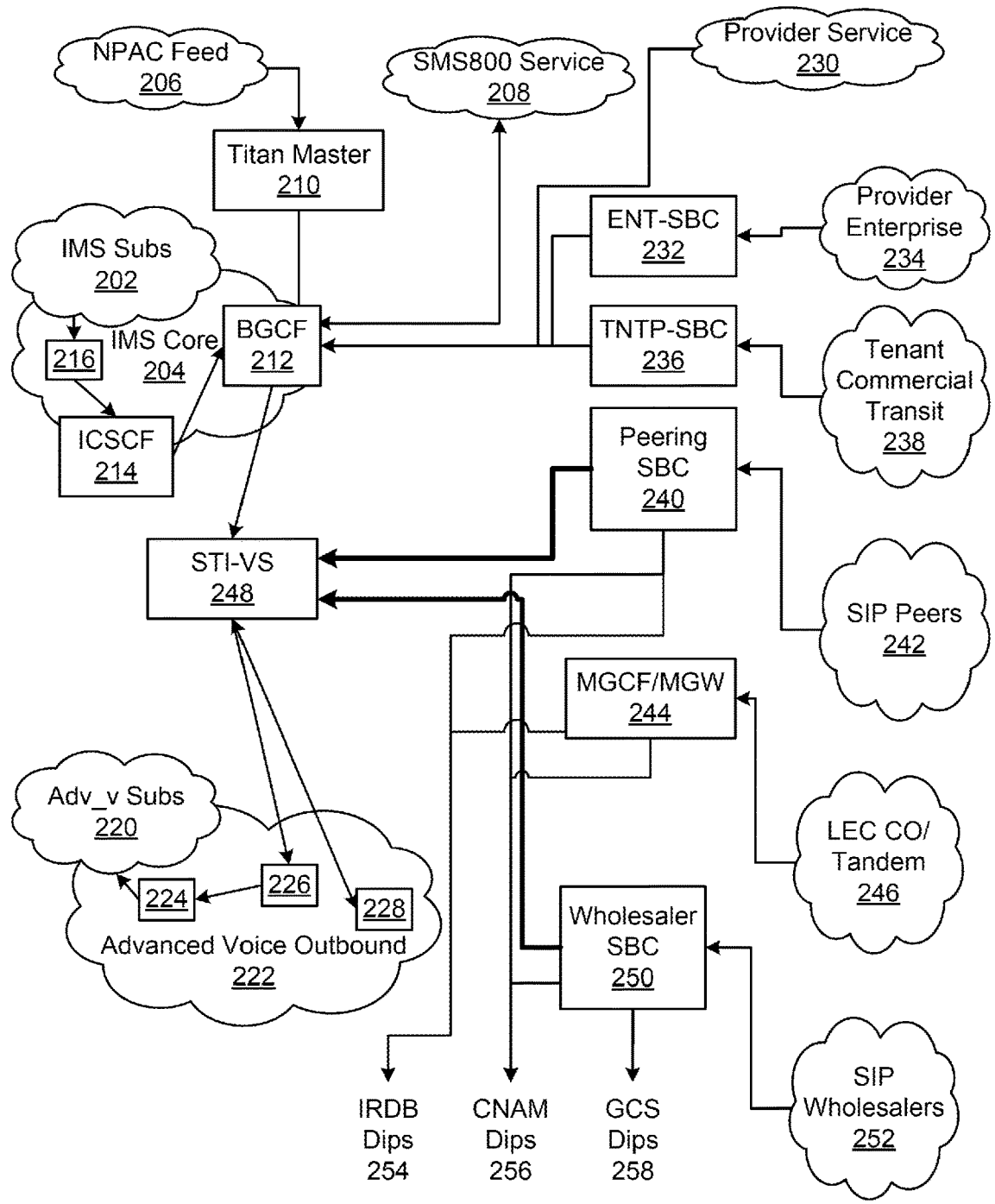
FIG. 2B is a block diagram illustrating an example environment.

FIG. 2A and FIG. 2B are a block diagrams illustrating an example environment. It should be understood that the methods and systems described herein are not limited to the example environment, which is only used for purposes of illustration. The example environment may comprise one or more Internet Protocol (IP) Multimedia Subsystem (IMP) subscribers 202, an IMS core 204, a National Portability Administration Center (NPAC) feed 206, a Short Message Service (SMS)/800 service feed 208, a routing database (DB) master 210, a Secure Telephone Identity Authentication Service (STI-AS) 218, one or more advanced voice subscribers 220, an advanced voice outbound network 222, a peering SBC 240, a Session Initiation Protocol (SIP) Peers network 242, a media gateway controller function and/or a media gateway 244, and a local exchange carrier (LEC) and/or tandem network 246.

The IMS core 204 may comprise one or more devices configured to route messages. A device for routing messages may comprise a switch, a router, a Breakout Gateway Control Function (BGCF) 212, an Interrogating Call Session Control Function (I-CSCF) 214, a Home Subscriber Server (HSS) 216, a Serving Call Session Control Function (S-CSCF), a telephony application server (TAS), and/or a broadband application server (BAS). The advanced voice outbound network 222 may comprise one or more devices for routing messages. A device for routing messages may comprise a switch, a router, a Proxy-Call Session Control Function (P-CSCF) 224, an advanced voice application server (AV-AS) 226, and/or an advanced voice network server 228 (AV-NS).

A device and/or a user associated with one of the one or more advanced voice subscribers 220 (originator) may create a message to initiate a call. The message generated by the originator may comprise a header. The header may comprise information associated with the originator. Information related to the originator may comprise a phone number, caller id, address, etc. associated with the originator. The information related to the originator in the header may not be actual information related to the originator. The originator may comprise a telephone connected to a PBX, and the information related to the originator may comprise a phone number associated with the PBX. If a failover occurs, in which an entity experiences a failure with a communication system at a premises, the originator may comprise a call center, and the information related to the originator may comprise a phone number associated with the premises.

The originator may forward the message via the advanced voice outbound network 222. The originator may forward the message to the P-CSCF 224. The P-CSCF 224 may forward the message to the AV-AS 226. The AV-AS 226 may forward the message to the AV-NS 228, the STI-AS 218, and the BGCF 212. The STI-AS 218 may apply a signature to the message in accordance with a method described in FIG. 4. The STI-AS 218 may forward a signed message (e.g., or an unsigned message if no signature is applied) to the BGCF 212. The BGCF 212 may receive the signed message from the STI-AS 218. Optionally and/or alternatively, the BGCF 212 may receive the message without a signature applied. The AV-AS 226, the STI-AS 218, or other device may determine to forward the message to the BGCF 212 without signing the message.

The NPAC feed 206 may forward routing instructions and/or portability data to the routing DB master 210. The routing DB master 210 may comprise a database for routing instructions and/or portability data. The routing DB master 210 may populate the database with the routing instructions and/or portability data received from the NPAC feed 206. The BGCF 212 may refer to the routing DB master 210 for routing instructions and/or portability data. The SMS/800 service feed 208 may provide information about toll free phone numbers to the BGCF 212.

If a destination associated with the message is one of the one or more IMS subscribers 202 (destination), then the BGCF 212 may forward the message via the IMS core 204 to the destination. The message may comprise the possibly signed message and/or the message without a signature. Forwarding the message via the IMS core 204 may comprise forwarding the message via one or more devices for routing messages. The BGCF 212 may forward the message to the I-CSCF 214. The I-CSCF 214 may forward the message to the HSS 216. The HSS 216 may forward the message to the destination.

If a destination associated with the message is located within the SIP Peers network 242, then the BGCF 212 may forward the message to the peering SBC 240. The message may comprise the possibly signed message and/or the message without a signature. The peering SBC 240 may forward the message to the destination within the SIP Peers network 242.

If a destination associated with the message is located within the LEC and/or tandem network 246, then the BGCF 212 may forward the message to the media gateway controller function and/or the media gateway 244. The message may comprise the possibly signed message and/or the message without a signature. The media gateway controller function and/or the media gateway 244 may forward the message to the destination within the LEC and/or tandem network 246.

FIG. 2B is a block diagram illustrating an example environment. The example environment may comprise many of the same elements as the example environment of FIG. 2A. Additionally, the example environment may comprise a Secure Telephone Identity Verification Service (STI-VS) 248, a wholesaler SBC 250, and a SIP wholesalers network 252. The BGCF 212 may receive a message. The message may comprise a possibly signed message and/or a message without a signature. A destination associated with the message may be associated with one of the one or more advanced subscribers 220.

If the message was created by one of the one or more IMS subscribers 202 (originator), then the originator may forward the message via the IMS core 204 to the BGCF 212. Forwarding the message via the IMS core 204 may comprise forwarding the message via one or more devices for routing messages. The originator may forward the message to the HSS 216. The HSS 216 may forward the message to the I-CSCF 214. The I-CSCF 214 may forward the message to the BGCF 212.

If an originator associated with the message is located within the SIP Peers network 242, then the originator may forward the message to the peering SBC 240. The peering SBC 240 may forward the message to the STI-VS 248. In response to receiving the message, the peering SBC 240 may initiate an integrated routing database (IRDB) dip 254 and/or a Caller-ID Name (CNAM) dip 256. The CNAM dip 256 may comprise looking up a name associated with a caller id associated with the message.

If an originator associated with the message is located within the LEC and/or tandem network 246, then the originator may forward the message to the media gateway controller function and/or the media gateway 244. The media gateway controller function and/or the media gateway 244 may forward the message to the STI-VS 248. In response to receiving the message, the media gateway controller function and/or the media gateway 244 may initiate an IRDB dip 254 and/or a CNAM dip 256. The CNAM dip 256 may comprise looking up a name associated with a caller id associated with the message.

If an originator associated with the message is located in the SIP wholesaler network 252, then the originator may forward the message to the wholesaler SBC 250. The wholesaler SBC 250 may forward the message to the STI-VS 248. In response to receiving the message, the wholesaler SBC 250 may initiate a CNAM dip 256. The CNAM dip 256 may comprise looking up a name associated with a caller id associated with the message.

The BGCF 212 may forward the message to the STI-VS 248. The STI-VS 248 may use a public key associated with a private key associated with the originator to verify a signature associated with the message. The STI-VS 248 may determine an attestation value associated with the message. If the attestation value indicates a value less than full attestation, then the STI-VS 248 may initiate one or more protective actions (e.g., causing a notification to be displayed or output on the destination, etc.). The STI-VS 248 may forward the message to the advanced voice outbound network 222. The STI-VS 248 may forward the message to the AV-NS 228. The STI-VS 248 may forward the message to the AV-AS 226. The AV-AS 226 may forward the message to the P-CSCF 224. The P-CSCF 224 may forward the message to the destination. It should be understood, that in other implementations, one or more of the devices shown in FIG. 2A and FIG. 2B may be removed and/or other devices not show may be included.

Figure 3:
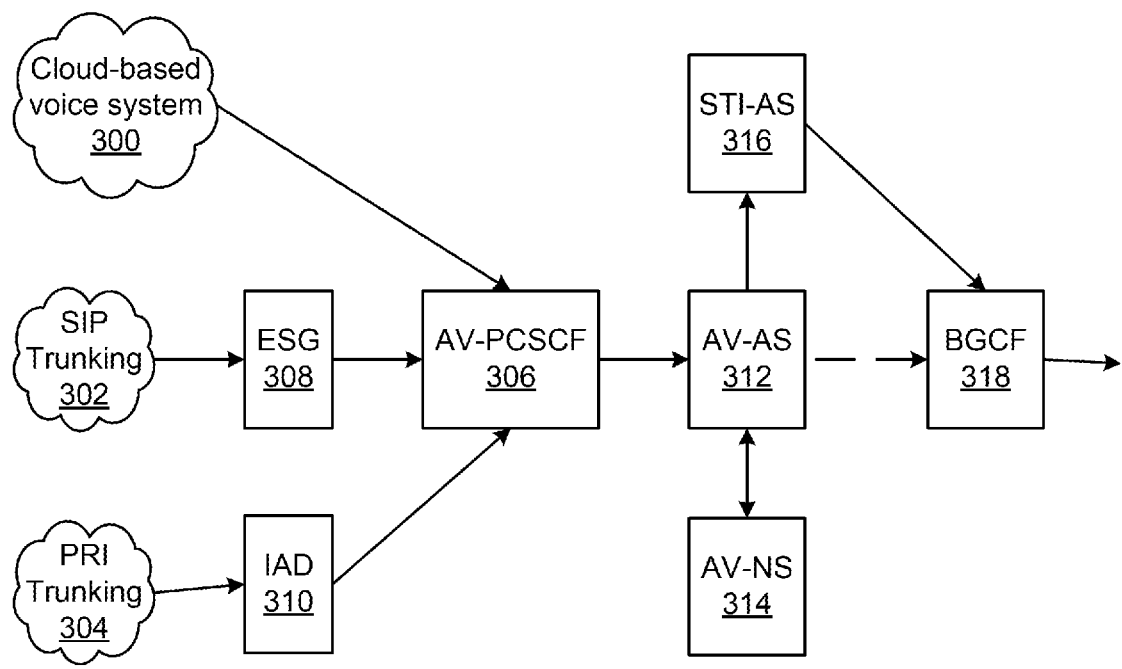
FIG. 3 is a block diagram illustrating an example environment.

FIG. 3 is a block diagram illustrating an example environment. The environment may comprise a cloud-based voice system 300, a Session Initiation Protocol (SIP) trunking system 302, a Primary Rate Interface (PRI) trunking system 304, an advanced voice Proxy-Call Session Control Function (AV-PCSCF) 306, an edge services gateway (ESG) 308, an integrated access device (IAD) 310, an AV-AS 312, an AV-NS 314, a Secure Telephone Identity Authentication Service (STI-AS) 316, a Breakout Gateway Control Function (BGCF) 318, a combination thereof, and/or the like.

A message to initiate a communication may be created by an originating device (originator). The cloud-based voice system 300 may comprise the originator. The cloud-based voice system may forward the message to the AV-PCSCF 306. The SIP trunking system 302 may comprise the originator. The SIP trunking system 302 may forward the message to the ESG 308. If the message comprises a diversion header value that is not a provisioned number (e.g., a number provisioned by a service provider associated with the ESG 308), then the ESG 308 may overwrite the diversion header with an account number provisioned by a service provider. If the message comprises an identifier in a "from" field (e.g., a value of the <orig> in the "from" field) that is not a provisioned number, then the ESG 308 may populate the diversion header with an account number provisioned by a service provider. The ESG 308 may forward the message to the AV-PCSCF 306. Alternatively, these functions performed by ESG 308 may be performed by the SIP Trunking 302, AV-PCSCF 306, and/or other device.

The PRI trunking system 304 may comprise the originator. The PRI trunking system 304 may forward the message to the IAD 310. If the message comprises a diversion header value that is not a provisioned number, then the IAD 310 may overwrite the diversion header with an account number provisioned by a service provider. If the message comprises an identifier in a field that is not a provisioned number (e.g., a number provisioned by a service provider associated with the ESG 308), then the IAD 310 may populate the diversion header with an account number provisioned by a service provider. The IAD 310 may forward the message to the AV-PCSCF 306. Alternatively, these functions performed by IAD 310 may be performed by the PRI Trunking 308, AV-PCSCF 306, and/or other device. A PBX may comprise the originator. The originator may be associated with a number, a name, and/or an address. The PBX may be associated with a number, a name, and/or an address. The message may comprise information purported to be associated with an originator in an identity header. The information in the identity header may be associated with the PBX. The AV-PCSCF 306 may strip the message of an identity header. The AV-PCSCF 306 may forward the message to the AV-AS 312. In some implementations, the cloud-based voice system 300, the SIP trunking 302, the PRI trunking 304, the ESG 308, and/or the IAD 310 may send the message directly to the AV-AS 312 and/or STI-AS 316. One or more of the devices shown in FIG. 3 may be omitted or combined into a single device.

If the message comprises a provisioned number in a diversion header, then the AV-AS 312 may place an address associated with the AV-AS 312 in a PAID header associated with the message. If the message comprises no diversion header and a provisioned number in a from header, then the AV-AS 312 may reformulate the "from" header and the PAID header into a format associated with the AV-AS 312 and the AV-AS 312 may place the reformulated PAID header into the message if the message comprises no PAID header. The AV-AS 312 may forward the message to the AV-NS 314 to receive further routing decision. The AV-AS 312 may forward the message to the STI-AS 316 based on routing decision received from AV-NS 314. The STI-AS 316 may determine an attestation value and apply a signature in accordance with the methods described herein (e.g., in FIG. 4 or elsewhere). The STI-AS 316 may forward a signed message to the BGCF 318. The AV-AS 312 may forward an unsigned version of the message to the BGCF 318. The BGCF 318 may forward the signed message and/or the unsigned version of the message via a network.

Figure 4:
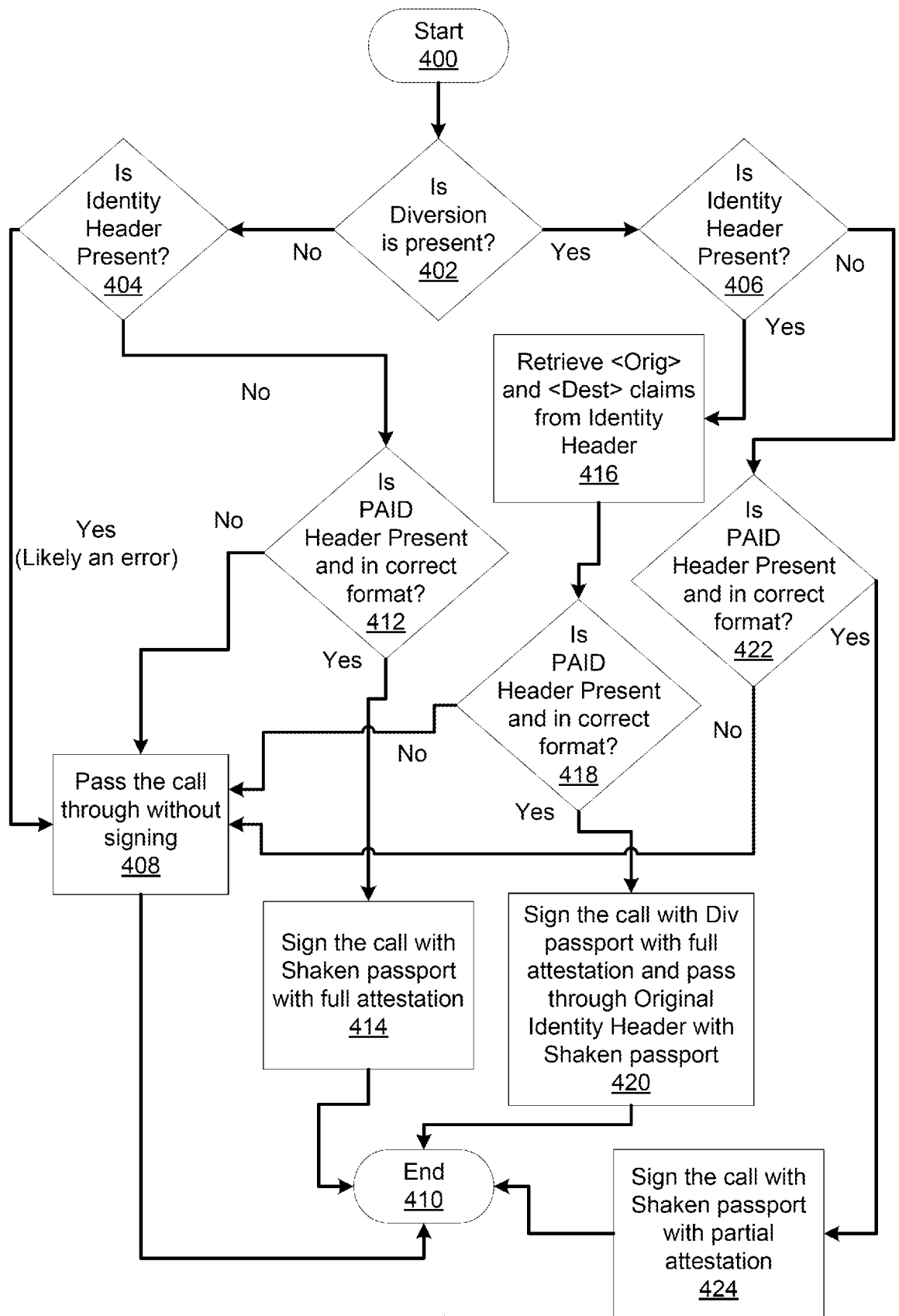
FIG. 4 is a flow diagram illustrating an example method.

FIG. 4 is a flow diagram illustrating an example method. The method may be executed by any of the devices described herein. The first network device 110 in FIG. 1, the STI-AS 218 in FIG. 2A, the STI-AS 316 in FIG. 3, and/or any other similar devices may comprise one or more computing devices configured to execute the example method. Although it is not required, the method may begin in response to receiving a message to initiate a call (e.g., or other communication session). At step 402, a determination may be made as to whether a diversion header field associated with the message comprises a value or is present. If there is no value in the diversion header field, or if the field is not present, then the example method may proceed to step 404. If there is a value in the diversion header field, then the example method may proceed to step 406. The determination of whether the diversion header field associated with the message comprises the value may comprise determining the presence or absence of a diversion header (e.g., or diversion header field).

At step 404, a determination may be made of whether an identity header field associated with the message comprises a value or whether the identity header field is present (e.g., in the message). If there is a value in the identity header field (e.g., or an identity head field is present), then an assumption of an error may be made. If there is a value in the identity header field, then the example method may proceed to step 408. If there is no value in the identity header field, then the example method may proceed to step 412. The determination of whether an identity header field associated with the message comprises a value may comprise determining the presence or absence of an identity header (e.g., or an identity header field).

At step 406, a determination may be made of whether an identity header field associated with the message comprises a value. If there is a value in the identity header field, then the example method may proceed to step 416. If there is no value in the identity header field, then the example method may proceed to step 422. At step 408, the one or more computing devices may forward the message without applying a signature to the message. In some implementations, step 408 may comprise applying a partial attestation, a gateway attestation, and/or the like. After step 408, the example method may proceed to step 410. At step 410, the method may end. The method may be repeated each time a message is received.

At step 412, a determination may be made of whether a PAID header field associated with the message comprises a value and if the value is in a correct format. If there is no value in the PAID header field, or if the value in the PAID header field is not in the correct format, then the example method may proceed to step 408. If there is a value in the PAID header field and the value in the PAID header field is in the correct format, then the example method may proceed to step 414.

At step 414, the one or more computing devices may apply a signature to the message. Applying the signature to the message may comprise applying an authentication protocol, validation protocol, encryption protocol, security protocol, and/or the like. The signature may be based a token, such as an assertion token, or a persona assertion token. Applying the signature may comprise generating and/or formatting the signature based on a Secure Handling of Asserted information using toKENs (SHAKEN) protocol. The signature may be associated with (e.g., in the message) an identifier that indicates the SHAKEN protocol. The signature may comprise a SHAKEN Personal Assertion Token (PASSporT). The SHAKEN PASSporT may comprise an attestation value indicating full attestation. The one or more computing devices may forward the signed message. After step 414, the example method may proceed to step 410.

At step 416, the one or more computing devices may retrieve an originator value and a destination value from the identity header. The originator value (e.g., <orig> value) may comprise one or more of a calling number, name associated with an originator, a Uniform Resource Identifier (URI) associated with an originator, an address associated with an originator, etc. The destination value (e.g., <dest> value) may comprise one or more of a called number, name associated with a destination, a URI associated with a destination, an address associated with a call destination, etc. After step 416, the example method may proceed to step 418.

At step 418, a determination may be made of whether a PAID header field associated with the message comprises a value and if the value is in a correct format. If there is no value in the PAID header field, or if the value in the PAID header field is not in the correct format, then the example method may proceed to step 408. If there is a value in the PAID header field and the value in the PAID header field is in the correct format, then the example method may proceed to step 420.

At step 420, the one or more computing devices may apply a signature to the message. Applying the signature to the message may comprise applying (e.g., adding) a Div PASSportT (e.g., a token in a diversion header). The message may comprise a SHAKEN PASSport before the signature is applied. Applying the signature to the message may comprise preserving the original identity header (e.g., with the SHAKEN PASSporT) and adding a second identity header with a Div PASSporT to the message. The Div PASSporT may comprise an attestation value indicating full attestation. The one or more computing devices may forward the signed message. After step 420, the example method may proceed to step 410.

At step 422, a determination may be made of whether a PAID header field associated with the message comprises a value and/or if the value is in a correct format. If there is no value in the PAID header field, or if the value in the PAID header field is not in the correct format, then the example method may proceed to step 408. If there is a value in the PAID header field and the value in the PAID header field is in the correct format, then the example method may proceed to step 424.

At step 424, the one or more computing devices may apply a signature to the message. Applying the signature to the message may comprise applying a SHAKEN PASSporT to the message. The SHAKEN PASSporT may comprise an attestation value indicating less than full attestation. The attestation value indicating less than full attestation may comprise partial attestation, gateway attestation, etc. The one or more computing devices may forward the signed message. After step 424, the example method may proceed to step 410.

Figure 5:
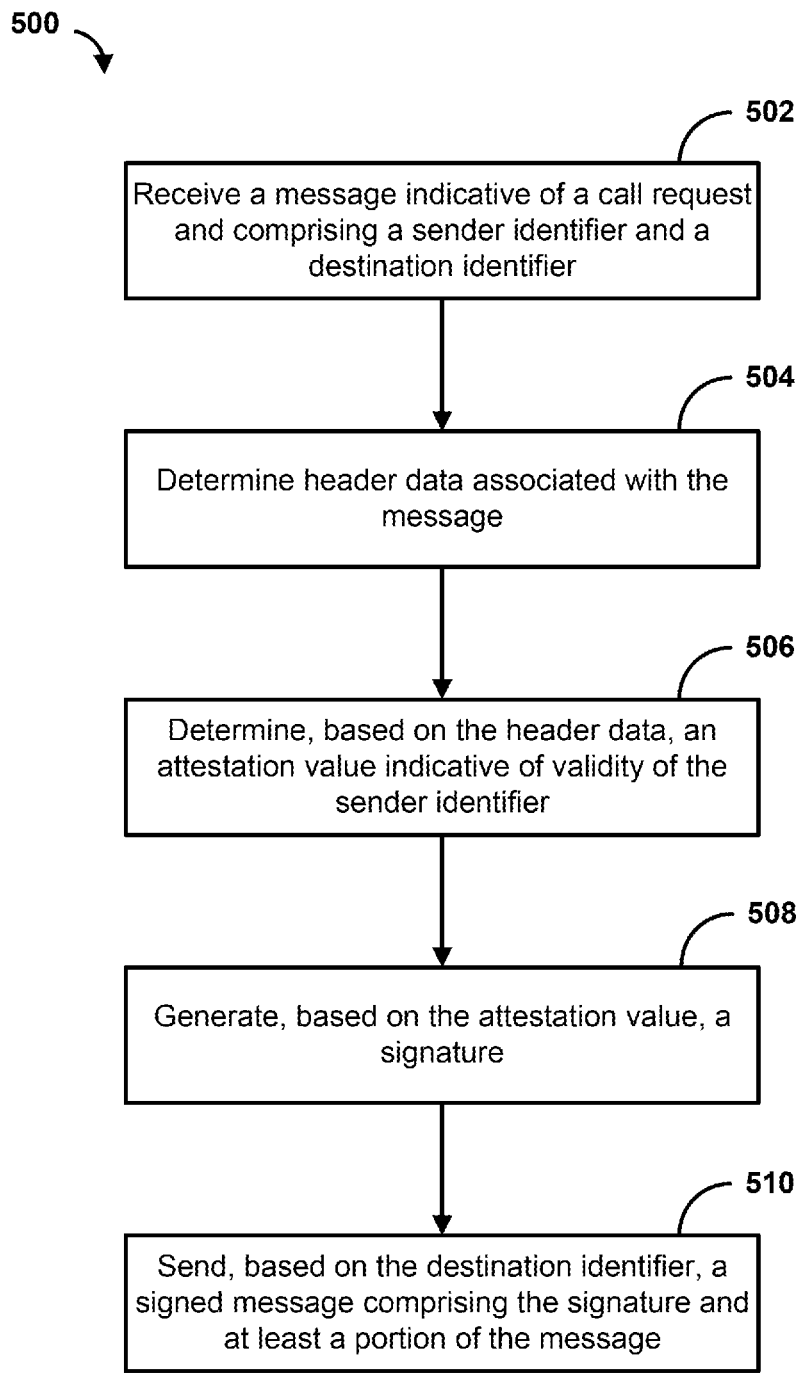
FIG. 5 is a flow diagram illustrating an example method.

FIG. 5 is a flow diagram illustrating an example method 500. At step 502, a message indicative of a call request may be received. The first network device 110 in FIG. 1, the STI-AS 218 in FIG. 2A, the STI-AS 316 in FIG. 3, and/or any other similar devices may receive a message indicative of a call request. The message may comprise a sender identifier. The sender identifier may be inauthentic (e.g., invalid, untrustworthy) and/or some sender information may be missing. The message may comprise a destination identifier. The message may comprise a SIP invite message. The message may be received by a computing device. The computing device may be managed by a first service provider. The message may be received from a network not managed by the first service provider. The message may be received from a private branch exchange.

The sender identifier may comprise an identifier associated with a first user sending (e.g., originating) the message. The sender identifier may comprise one or more of a domain associated with a sender, an email address, a telephone number, a network address, an internet protocol address, or a uniform resource identifier. The destination identifier may comprise an identifier associated with a second user intended to receive the message. The destination identifier may comprise one or more of a domain associated with a second user, an email address, a telephone number, a network address, an internet protocol address, or a uniform resource identifier.

The message may comprise one or more of a communication protocol message or a SIP message. The message may be part of a call initiation sequence. The message may be associated with establishing one or more of a communication session, a media communication session, an audio call, or a video call.

At step 504, header data associated with the message may be determined. The first network device 110 in FIG. 1, the STI-AS 218 in FIG. 2A, the STI-AS 316 in FIG. 3, and/or any other similar devices may determine header data associated with the message. Determining the header data associated with the message may comprise determining one or more of a diversion header or an identity header. Determining header data may comprise determining that one or more headers (e.g., diversion header, identity header) or header values are absent from the message. The header data may comprise a header field, a protocol variable, a protocol command, a protocol method, metadata indicative of the message or a data payload, timing information associated with the message, routing information, redirection information, connection information, sequence information, version information, the sender identifier, or the destination identifier. The header data may comprise data associated with one or more of routing a data payload, forwarding the message, or processing the message. The header data may comprise a paid header.

The diversion header may be associated with redirection of the message. The diversion header may comprise redirection information, information indicative of a device forwarding the message, or data indicative of a reason for the redirection. The message may comprise a plurality of diversion headers. Determining the header data may comprise determining one of the plurality of diversion headers. The identity header may be associated with indicating an identity of the user and/or user device sending the message. The identity header may comprise a SIP identity header. The identity header may be inserted by a network device that did not originate the message. The identity header may comprise an identifier of the network device. The message may comprise a plurality of identity headers. Determining the header data may comprise determining one or more of the plurality of identity headers.

At step 506, an attestation value may be determined. The attestation value may be determined based on the header data. The attestation value may be indicative of trustworthiness of the usage of the sender identifier in the message. The attestation value may be indicative of authenticity (e.g., validity) of the sender identifier. The attestation value may be indicative of a level of trust that the sender identifier is authentic (e.g., or accurately represents the sender, or is used by a sender authorized to use the sender identifier) and/or has been authenticated. The attestation value may be indicative of a level of trust that that the sender or originator has been authenticated to use the sender identifier. The first network device 110 in FIG. 1, the STI-AS 218 in FIG. 2A, the STI-AS 316 in FIG. 3, and/or any other similar devices may determine an attestation value indicative of authenticity (e.g., validity, trustworthiness) of the sender identifier based on the header data. The attestation value may be one of a plurality of attestation values. The plurality of attestation values may indicate different levels of one or more of expected authenticity (e.g., validity) or trustworthiness.

The plurality of attestation values may comprise one or more of a first attestation (e.g., full attestation), a second attestation (e.g., a partial attestation), a third attestation (e.g., a gateway attestation), or no attestation. The first attestation may indicate that the sender identifier is determined to be one or more of authenticated, verified, or trusted. The second attestation may indicate that sender identifier has not been determined to be one or more of authenticated, verified, or trusted but the sender of the message is one or more of authenticated, verified, or trusted. The third attestation may indicate that a network device from which the message was received is one or more of authenticated, verified, or trusted. If no attestation value is present, it may indicate that no information of the message is one or more of authenticated, verified, or trusted.

The attestation value may be determined based on one or more attestation rules. The one or attestation rules may associate message features with corresponding attestation values. The message features may comprise values and/or the presence of one or more data fields, data values, header fields, or header values. A combination of multiple message features may be associated with a corresponding attestation value.

At step 508, a signature may be generated based on the attestation value. The first network device 110 in FIG. 1, the STI-AS 218 in FIG. 2A, the STI-AS 316 in FIG. 3, and/or any other similar devices may generate a signature based on the attestation value. Generating the signature may comprise applying a cryptographic process to at least the attestation value. Generating the signature may be based on one or more of a validation protocol, authentication protocol, or a security protocol. The signature may be based on a certificate. The certificate may be generated by and/or received from a certificate authority (e.g., certificate management system, certification management device). The signature and/or certificate may comprise a cryptographic key, such as a private key associated with a public/private key-pair. Generating the signature may comprise encrypting the attestation value (e.g., along with other values). The signature may be generated based on one or more of a secure telephone identity revisited (STIR) protocol or a secure handling of asserted information using tokens (SHAKEN) protocol.

At step 510, a signed message comprising the signature and at least a portion of the message may be sent based on the destination identifier. The first network device 110 in FIG. 1, the STI-AS 218 in FIG. 2A, the STI-AS 316 in FIG. 3, and/or any other similar devices may send a signed message comprising the signature and at least a portion of the message based on the destination identifier.

Figure 6:
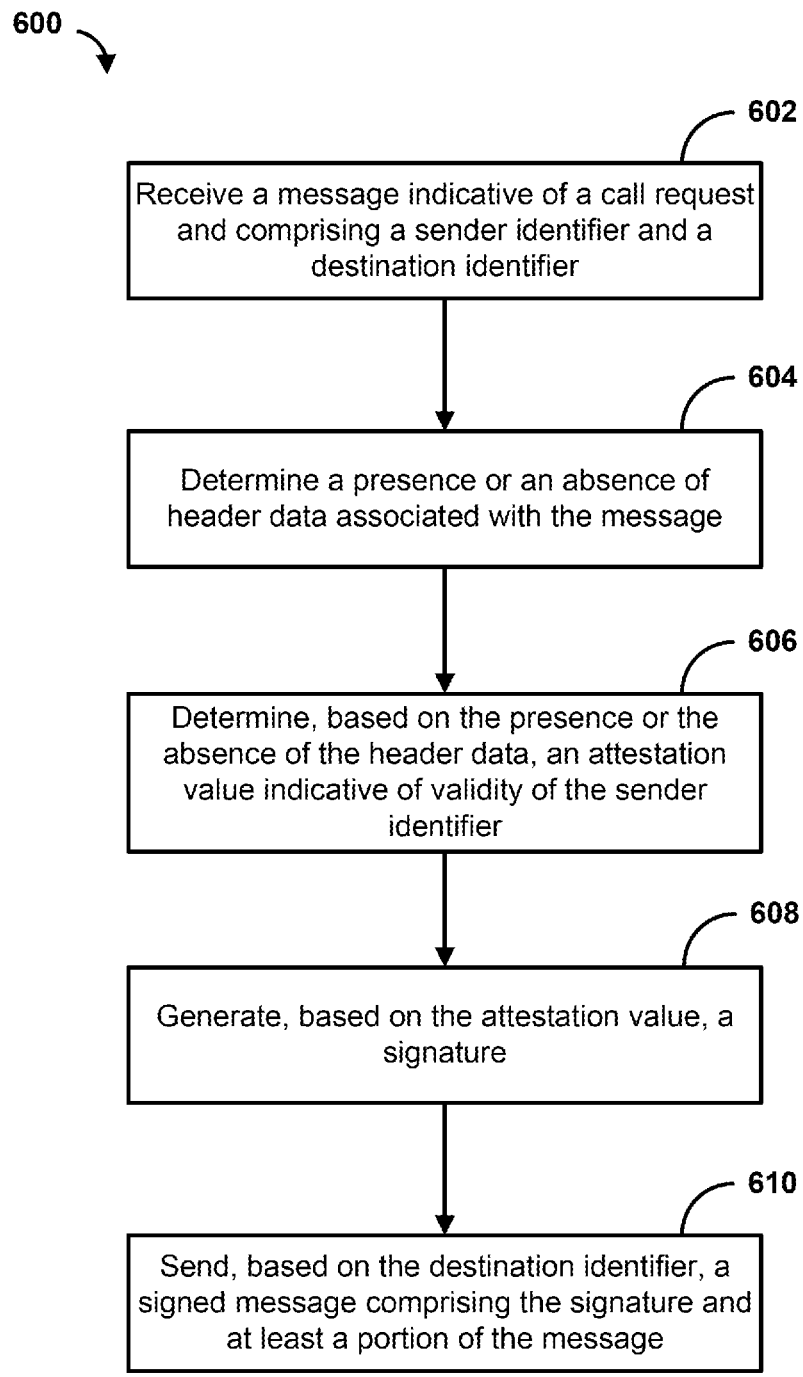
FIG. 6 is a flow diagram illustrating an example method.

FIG. 6 is a flow diagram illustrating an example method 600. At step 602, a message indicative of a call request may be received. The first network device 110 in FIG. 1, the STI-AS 218 in FIG. 2A, the STI-AS 316 in FIG. 3, and/or any other similar devices may receive a message indicative of a call request. The message may comprise a sender identifier and/or a destination identifier. The sender identifier may be inauthentic (e.g., invalid, untrustworthy) and/or some sender information may be missing. The message may comprise a SIP invite message. The message may be received by a computing device. The computing device may be managed by a first service provider. The message may be received from a network not managed by the first service provider. The message may be received from a private branch exchange.

The sender identifier may comprise an identifier associated with a first user sending (e.g., originating) the message. The sender identifier may comprise one or more of a domain associated with a sender, an email address, a telephone number, a network address, an internet protocol address, or a uniform resource identifier. The destination identifier may comprise an identifier associated with a second user intended to receive the message. The destination identifier may comprise one or more of a domain associated with a second user, an email address, a telephone number, a network address, an internet protocol address, or a uniform resource identifier. The message may comprise one or more of a communication protocol message or a SIP message. The message may be part of a call initiation sequence. The message may be associated with establishing one or more of a communication session, a media communication session, an audio call, or a video call.

At step 604, a presence or an absence of header data associated with the message may be determined. The first network device 110 in FIG. 1, the STI-AS 218 in FIG. 2A, the STI-AS 316 in FIG. 3, and/or any other similar devices may determine a presence or an absence of header data associated with the message. Determining the presence or the absence of the header data may comprise determining a presence or an absence of one or more of a diversion header or an identity header. The header data may comprise a header field, a protocol variable, a protocol command, a protocol method, metadata indicative of the message or a data payload, timing information associated with the message, routing information, redirection information, connection information, sequence information, version information, the sender identifier, or the destination identifier. The header data may comprise data associated with one or more of routing a data payload, forwarding the message, or processing the message. The header data may comprise a paid header.

The diversion header may be associated with redirection of the message. The diversion header may comprise redirection information, information indicative of a device forwarding the message, or data indicative of a reason for the redirection. The message may comprise a plurality of diversion headers. Determining the presence or the absence of header data may comprise determining a presence or an absence of one of the plurality of diversion headers. The identity header may be associated with indicating an identity of the user and/or user device sending the message. The identity header may comprise a SIP identity header. The identity header may be inserted by a network device that did not originate the message. The identity header may comprise an identifier of the network device. The message may comprise a plurality of identity headers. Determining the presence or the absence of header data may comprise determining a presence or an absence of one of the plurality of identity headers.

At step 606, an attestation value may be determined. The attestation value may be determined based on the presence or the absence of the header data. The attestation value may be indicative of trustworthiness of the usage of the sender identifier in the message. The attestation value may be indicative of authenticity (e.g., validity, trustworthiness) of the sender identifier. The attestation value may be indicative of a level of trust that the sender identifier is authentic (e.g., or accurately represents the sender, or is used by a sender authorized to use the sender identifier) and/or has been authenticated. The attestation value may be indicative of a level of trust that that the sender or originator has been authenticated to use the sender identifier. The first network device 110 in FIG. 1, the STI-AS 218 in FIG. 2A, the STI-AS 316 in FIG. 3, and/or any other similar devices may determine an attestation value indicative of authenticity of the sender identifier based on the presence or the absence of the header data. The attestation value may be one of a plurality of attestation values. The plurality of attestation values may indicate different levels of one or more of expected authenticity or trustworthiness.

The plurality of attestation values may comprise one or more of a first attestation (e.g., full attestation), a second attestation (e.g., a partial attestation), a third attestation (e.g., a gateway attestation), or no attestation. The first attestation may indicate that the sender identifier is determined to be one or more of authenticated, verified, or trusted. The second attestation may indicate that sender identifier has not been determined to be one or more of authenticated, verified, or trusted but the sender of the message is one or more of authenticated, verified, or trusted. The third attestation may indicate that a network device from which the message was received is one or more of authenticated, verified, or trusted. If no attestation value is present, it may indicate that no information of the message is one or more of authenticated, verified, or trusted.

The attestation value may be determined based on one or more attestation rules. The one or attestation rules may associate message features with corresponding attestation values. The message features may comprise values and/or the presence of one or more data fields, data values, header fields, or header values. A combination of multiple message features may be associated with a corresponding attestation value.

At step 608, a signature may be generated based on the attestation value. The first network device 110 in FIG. 1, the STI-AS 218 in FIG. 2A, the STI-AS 316 in FIG. 3, and/or any other similar devices may generate a signature based on the attestation value. Generating the signature may comprise applying a cryptographic process to at least the attestation value. Generating the signature may be based on one or more of a validation protocol, authentication protocol, or a security protocol. The signature may be based on a certificate. The certificate may be generated by and/or received from a certificate authority (e.g., a certificate management device, certificate management system). The signature and/or certificate may comprise a cryptographic key, such as a private key associated with a public/private key-pair. Generating the signature may comprise encrypting the attestation value. The signature may be generated based on one or more of a secure telephone identity revisited (STIR) protocol or a secure handling of asserted information using tokens (SHAKEN) protocol.

At step 610, a signed message comprising the signature and at least a portion of the message may be sent based on the destination identifier. The first network device 110 in FIG. 1, the STI-AS 218 in FIG. 2A, the STI-AS 316 in FIG. 3, and/or any other similar devices may send a signed message comprising the signature and at least a portion of the message based on the destination identifier.

Figure 7:
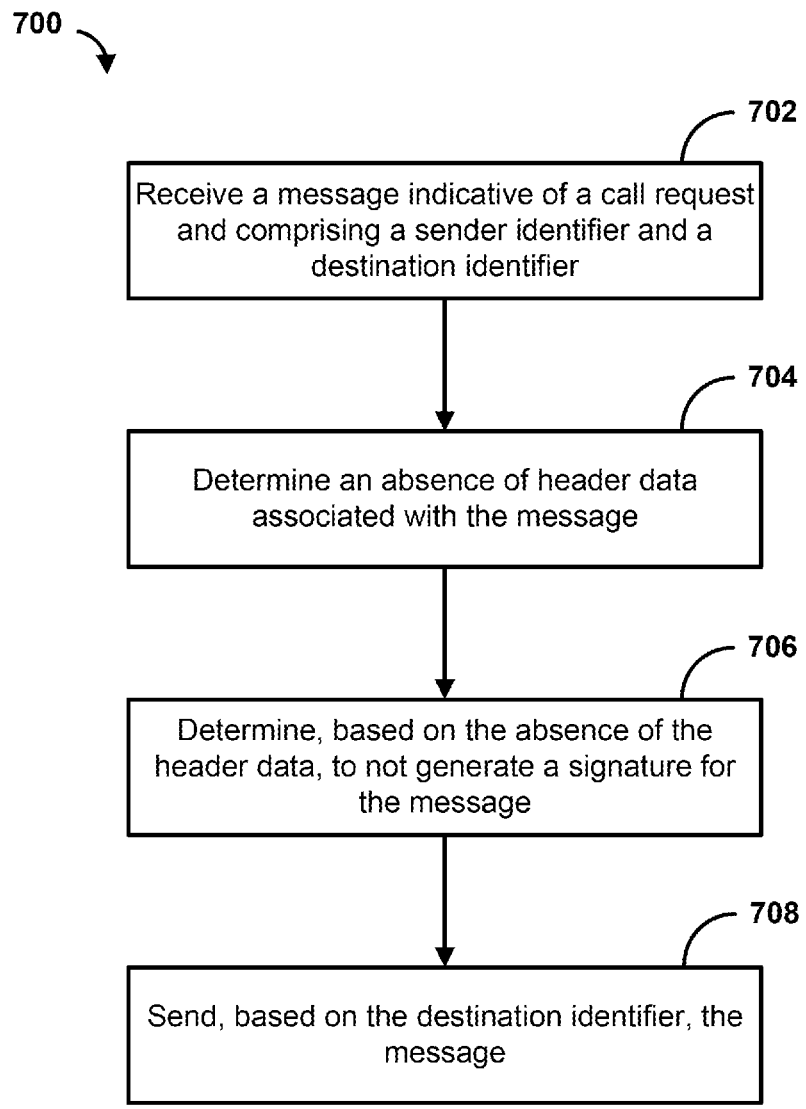
FIG. 7 is a flow diagram illustrating an example method.

FIG. 7 is a flow diagram illustrating an example method 700. At step 702, a message indicative of a call request may be received. The first network device 110 in FIG. 1, the STI-AS 218 in FIG. 2A, the STI-AS 316 in FIG. 3, and/or any other similar devices may receive a message indicative of a call request. The message may comprise a sender identifier and/or a destination identifier. The sender identifier may be inauthentic (e.g., invalid, untrustworthy) and/or some sender information may be missing. The message may comprise a SIP invite message. The message may be received by a computing device. The computing device may be managed by a first service provider. The message may be received from a network not managed by the first service provider. The message may be received from a private branch exchange.

The sender identifier may comprise an identifier associated with a first user sending (e.g., originating) the message. The sender identifier may comprise one or more of a domain associated with a sender, an email address, a telephone number, a network address, an internet protocol address, or a uniform resource identifier. The destination identifier may comprise an identifier associated with a second user intended to receive the message. The destination identifier may comprise one or more of a domain associated with a second user, an email address, a telephone number, a network address, an internet protocol address, or a uniform resource identifier.

The message may comprise one or more of a communication protocol message or a SIP message. The message may be part of a call initiation sequence. The message may be associated with establishing one or more of a communication session, a media communication session, an audio call, or a video call.

At step 704, an absence of header data associated with the message may be determined. The first network device 110 in FIG. 1, the STI-AS 218 in FIG. 2A, the STI-AS 316 in FIG. 3, and/or any other similar devices may determine an absence of header data associated with the message. Determining the absence of the header data may comprise determining an absence of one or more of a diversion header or an identity header. Determining the absence of the header data may comprise determining an absence of one or more of: a header field, a protocol variable, a protocol command, a protocol method, metadata indicative of the message or a data payload, timing information associated with the message, routing information, redirection information, connection information, sequence information, version information, the sender identifier, or the destination identifier. Determining the absence of the header data may comprise determining an absence of data associated with one or more of: routing a data payload, forwarding the message, or processing the message. Determining the absence of the header data may comprise determining an absence of a paid header.

Determining the absence of the header data may comprise determining an absence of the diversion header. Determining the absence of the diversion header may comprise determining an absence of information associated with redirection of the message. Determining the absence of the diversion header may comprise determining an absence of one or more of: redirection information, information indicative of a device forwarding the message, or data indicative of a reason for the redirection.

Determining the absence of the header data may comprise determining an absence of the identity header. Determining an absence of the identity header may comprise determining an absence of information indicating an identity of the user and/or user device sending the message. Determining an absence of the identity header may comprise determining an absence of a SIP identity header. Determining an absence of the identity header may comprise determining an absence of a header inserted by a network device that did not originate the message. Determining an absence of the identity header may comprise determining an absence of an identifier of the network device.

At step 706, a determination to send the message without a signature may be made. The determination to send the message without the signature may be made based on the absence of the header data. The first network device 110 in FIG. 1, the STI-AS 218 in FIG. 2A, the STI-AS 316 in FIG. 3, and/or any other similar devices may determine to send the message without the signature based on the absence of the header data. Determining to send the message without the signature may comprise determining that the message fails to meet one or more of a threshold authenticity or a threshold trustworthiness.

At step 708, the message may be sent based on the destination identifier. The first network device 110 in FIG. 1, the STI-AS 218 in FIG. 2A, the STI-AS 316 in FIG. 3, and/or any other similar devices may send the message based on the destination identifier. The message may be sent without a signature (e.g., without adding, applying, or inserting a signature).

Figure 8:
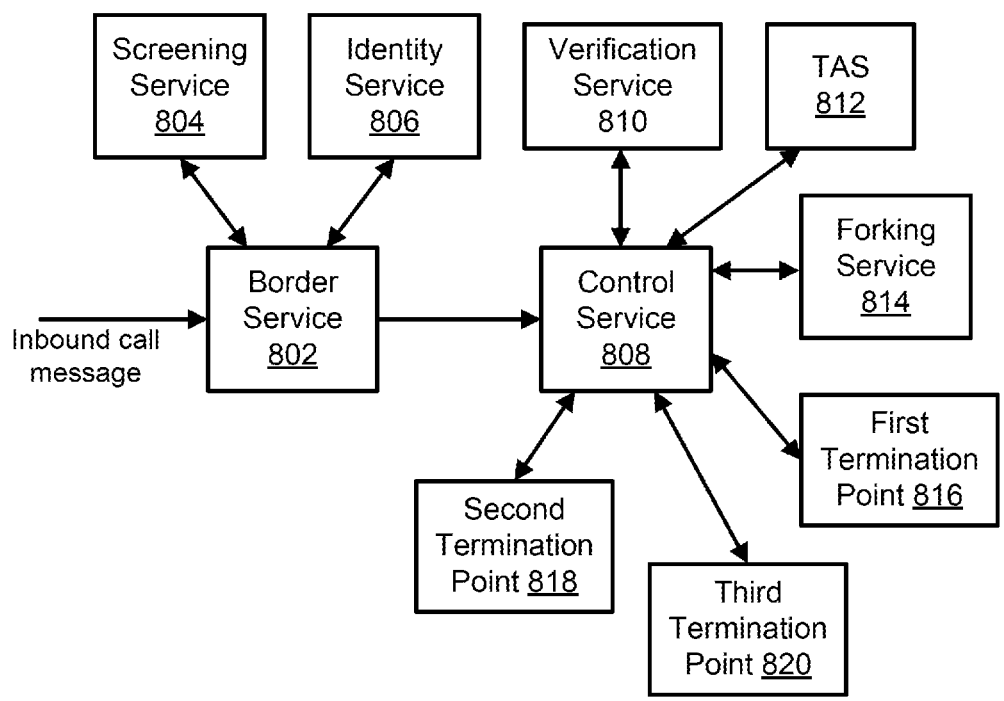
FIG. 8 is a block diagram illustrating an example environment.

FIG. 8 is a block diagram showing an example environment. The example environment may be configured to handle inbound calls. An inbound call may be received as data indicative of the inbound call. The data indicative of the inbound call may comprise a message, such as a SIP message, a SIP invite message, and/or the like. The example environment may comprise the second network device 120 and the destination device 122 of FIG. 1.

The data indicative of the inbound call may be received by a border service 802. The border service 802 may comprise a session border controller, an interconnection border control, a gateway, a computing device, and/or the like. The border service 802 may be configured to communicate with a screening service 804. The screening service 804 may be configured to perform an initial screening of the message. The initial screening may comprise determining whether a sender identifier (e.g., calling number, sending number) is an assigned or unassigned number. A database of assigned and/or unassigned numbers (e.g., pooled from all service providers) may be queried to determine whether the sender identifier is assigned. If the sender identifier is not assigned, the message may be discarded. The border service 802 may be configured to communicate with an identity service 806. The identity service 806 may comprise a Caller-ID Name (CNAM). The identity service 806 may be configured to determine (e.g., query from an identity server) a name (e.g., personal name, such as John Doe, company name), caller identifier, and/or the like associated with the message.

The border service 802 may be configured to add one or more headers to the message. The one or more headers may comprise information from the identity service 806, such as the name, caller identifier, and/or the like. The one or more headers may comprise information associated with a source of the message, such as geographic information (e.g., a geographic region and/or area originating the inbound call), source identifying information (e.g., a network or service provider that forwarded the message), and/or the like. The one or more headers may comprise an indication of whether the sender identifier is an assigned or unassigned number.

The border service 802 may be configured to send the message to a control service 808. The control service 808 may comprise a Call Session Control Function (CSCF). The control service 808 may be configured to control management of one or more call sessions associated with the inbound call.

The control service 808 may be configured to communicate with a verification service 810. The verification service 810 may comprise a Secure Telephone Identity Verification Service (STI-VS). The verification service 810 may be configured to process the message (e.g., the inbound call) using STIR/SHAKEN protocols. The verification service 810 may determine an attestation value, such as full attestation, partial attestation, gateway attestation, or no attestation. Attestation value may be added to the one or more headers of the message.

The control service 808 may be configured to communicate with a telephone application server (TAS) 812. The telephone application server 812 may be configured to process the message to provide telephone application features, such as call forwarding, call screening, and/or the like.

The control service 808 may be configured to communicate with a forking service 814. The forking service 814 may be configured to cause the message (e.g., a SIP Invite message) to be sent (e.g., forked) to a plurality of termination points, such as the first termination point 816, the second termination point 818, and the third termination point 820. Copies of the message may be simultaneously sent to each of the plurality of termination points. Causing the message to be sent to the plurality of termination points may cause simultaneous ringing (e.g., or any process that notifies a user of the inbound call) of the plurality of termination points.

The first termination point 816 may comprise nuisance call handling service (NCHS). The second termination point 818 may comprise a mobility service configured to connect inbound calls to a mobile device, such as a smart phone, smart watch, cell phone, tablet device, smart device, and/or the like. The third termination point 820 may comprise customer premises equipment, such as streaming device, VOIP phone, television, set top box, and/or the like.

The NCHS of the first termination point 816 may be configured to be analyze the message and/or data associated with the message to determine whether to intercept the message. The message may be intercepted if the message is indicative of a nuisance call (e.g., spam). The NCHS may be configured to analyze the message to determining if the call is indicative of neighborhood spoofing.

The NCHS may apply one or more intercept criteria to determine whether to intercept the message. If analysis of the message indicates that the message matches the intercept criteria, then the message may be intercepted. If analysis of the message indicates that the message does not match the intercept criteria, then a determination may be made to not intercept the message. The NCHS may cause the first termination point 816 to send a busy message, such as a SIP 4xx message (e.g., SIP 486 busy here message). Sending of the busy message may allow further call processing by the other termination points.

The NCHS may be configured to intercept the call by causing sending of a message indicative of a connection to at least part of the plurality of termination points, such as the second termination point 818 and the third termination point 820. Intercepting the call may cause ringing associated with one or more of the plurality of termination points to be terminated. Intercepting the call may comprise connecting the inbound call to an interactive voice response (IVR) service. Intercepting the call may comprise sending a call termination message, such as a SIP bye message. Intercepting the message may comprise forwarding the call to a voicemail service.

The one or more intercept criteria may comprise a matching of one or more digits of a destination identifier (e.g., called number, destination number) to one or more digits of the sender identifier. The intercept criteria may comprise criteria indicative of neighborhood spoofing. The intercept criteria may indicate matching of a number planning area (e.g., the first three digits after the area code) of the destination identifier and the sender identifier. The intercept criteria may indicate matching of the first six digits (e.g., NPA-NXX) of the destination identifier and the sender identifier. The intercept criteria may indicate matching of the last four digits of the destination identifier and the sender identifier.

The one or more intercept criteria may comprise a reputation score associated with the message (e.g., or a source of the message) being above or below a threshold. The one or more intercept criteria may comprise a failure of an authentication process. The one or more intercept criteria may comprise a condition of the sender identifier (e.g., or other identifier associated with the source/caller) being on a blacklist. The blacklist may comprise a system-wide blacklist, a personal blacklist associated with an entity (e.g., company, user) associated with the destination identifier.

If the message comprises a sender identifier (e.g., or other identifier associated with the source/caller) being on an exception list, the call may not be intercepted. Messages that match the intercept criteria may not be intercepted if the sender identifier (e.g., or other identifier associated with the source/caller) is on the exception list. The exception list may comprise a network-wide exception list (e.g., including 911 PSAP numbers, GETS numbers, etc.). The exception list may comprise an exception list associated with a user (e.g., unique to or specific to the user). The exception list associated with the user may have numbers (e.g., or other identifiers, such as email addresses) added by the user and/or numbers automatically added. The automatically added numbers be may added from an address book and/or contact list of the user. Frequently used numbers associated with the user may be added to the exception list (e.g., based on the usage of the number reaching a threshold number of times in a period). The user may be able to access the exception list via an application, such as a web application, a mobile application, a television application, a set top box application, and/or the like.

The one or more intercept criteria may comprise one or more conditions associated with the attestation value. If the attestation value indicates that the message has full attestation (e.g., or partial attestation), the message may be determined to not need to be intercepted (e.g., may be determined to not be a nuisance). If the attestation value indicates that the message has gateway attestation (e.g., or partial attestation) or no attestation, the message may be determined to satisfy an intercept criterion. A combination of a lower attestation value (e.g., lower than full attestation, including partial attestation, gateway attestation, or no attestation) and other criteria (e.g., neighborhood spoofing criteria) may indicate that the inbound call should be intercepted.

The one or more intercept criteria may comprise one or more conditions associated with the information in the one or more headers. If the information indicates that the sender identifier is unassigned, then the one or more intercept criteria may be satisfied. If the information indicates that the number is within or outside of a geographic area, then the one or more intercept criteria may be satisfied. If the information indicates that the name (e.g., caller ID) matches a pattern (e.g., has certain characters, letters, words), then the one or more intercept criteria may be satisfied.

The border service 802, screening service 804, identity service 806, control service 808, verification service 810, TAS 812, forking service 814, or a combination thereof may be implemented by one or more computing devices. The one or more computing devices may comprise the second network device 120 of FIG. 1. The second network device 120 may be configured to implement the border service 802, screening service 804, identity service 806, control service 808, verification service 810, TAS 812, forking service 814, or a combination thereof. The destination device 122 of FIG. 1 may comprise one of the plurality of termination points, such as the first termination point 816, the second termination point 818, or the third termination point 820.

Figure 9:
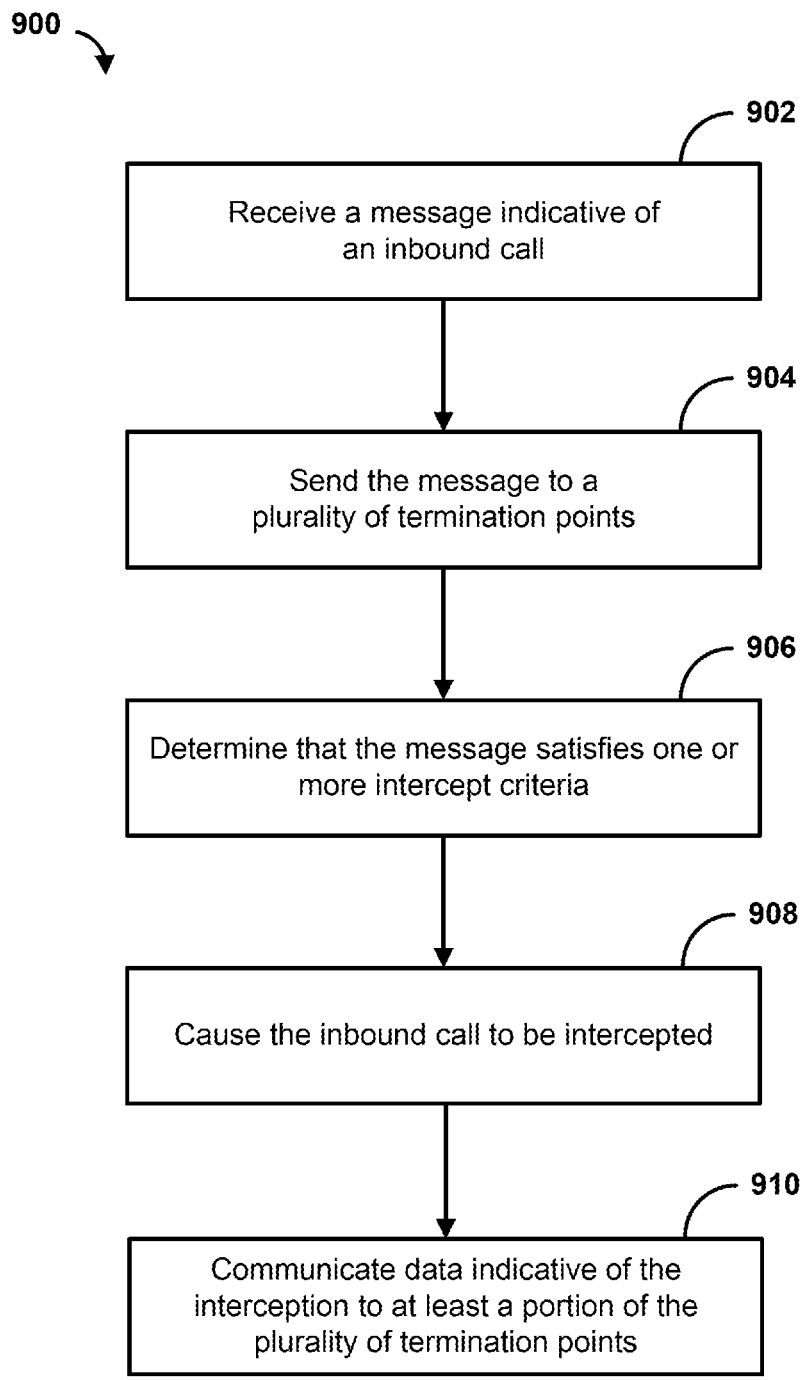
FIG. 9 is a flow diagram illustrating an example method.

FIG. 9 is a flow diagram illustrating an example method 900. At step 902, a message (e.g., or data) indicative of an inbound call may be received. The message may comprise a SIP message, such as a SIP invite Message. The message may be received by the border service 802, a session border controller, an interconnection border control, a gateway, a computing device, and/or the like.

At step 904, the message (e.g., or data indicative of the message) may be sent to a plurality of termination points. The message may be forked (e.g., copied, duplicated) into a plurality messages. The plurality of messages may be sent to corresponding termination points of a plurality of termination points. The plurality of termination points may comprise a first termination point, a second termination point, and a third termination point. Sending the plurality of messages may cause ringing (e.g., or other notification of a call to a user) of one or more of the plurality of termination points. The first termination point may comprise the nuisance call handling service (NCHS) of FIG. 8. The second termination point may comprise a mobility service configured to connect inbound calls to a mobile device, such as a smart phone, smart watch, cell phone, tablet device, smart device, and/or the like. The third termination point may comprise customer premises equipment, such as streaming device, VOIP phone, television, set top box, and/or the like.

At step 906, it may be determined that the message satisfies one or more intercept criteria. The message satisfying the one or more intercept criteria may be indicative of the inbound call being a nuisance call (e.g., spam call). The determination may be made using at least one of the plurality of termination points. The first termination point (e.g., the NCHS) may analyze the message and determine that the message satisfies the one or more intercept criteria. The one or more intercept criteria may indicate matching of a sender identifier (e.g., identifier of the caller) to a condition. The one or more intercept criteria may indicate matching of a destination identifier (e.g., identifier of the called) to a condition.

The one or more intercept criteria may comprise a matching of one or more digits of the destination identifier to one or more digits of the sender identifier. The intercept criteria may comprise criteria indicative of neighborhood spoofing. The intercept criteria may indicate matching of a number planning area (e.g., the first three digits after the area code) of the destination identifier and the sender identifier. The intercept criteria may indicate matching of the first six digits (e.g., NPA-NXX) of the destination identifier and the sender identifier. The intercept criteria may indicate matching of the last four digits of the destination identifier and the sender identifier.

The one or more intercept criteria may comprise a reputation score associated with the message (e.g., or a source of the message) being above or below a threshold. The one or more intercept criteria may comprise a failure of an authentication process. The one or more intercept criteria may be the sender identifier (e.g., or other identifier associated with the source/caller) being on a blacklist. The blacklist may comprise a system-wide blacklist, a personal blacklist associated with an entity (e.g., company, user) associated with the destination identifier.

If the message comprises a sender identifier (e.g., or other identifier associated with the source/caller) being on an exception list, the call may not be intercepted. Messages that match the intercept criteria may not be intercepted if the sender identifier (e.g., or other identifier associated with the source/caller) is on the exception list. The exception list may comprise a network-wide exception list (e.g., including 911 PSAP numbers, GETS numbers, etc.). The exception list may comprise an exception list associated with a user (e.g., unique to or specific to the user). The exception list associated with the user may have numbers (e.g., or other identifiers, such as email addresses) added by the user and/or numbers automatically added. The automatically added numbers be may added from an address book and/or contact list of the user. Frequently used numbers associated with the user may be added to the exception list (e.g., based on the usage of the number reaching a threshold number of times in a period). The user may be able to access the exception list via an application, such as a web application, a mobile application, a television application, a set top box application, and/or the like.

The one or more intercept criteria may comprise one or more conditions associated with the attestation value. If the attestation value indicates that the message has full attestation (e.g., or partial attestation), the message may be determined to not need to be intercepted (e.g., may be determined to not be a nuisance). If the attestation value indicates that the message has gateway attestation (e.g., or partial attestation) or no attestation, the message may be determined to satisfy an intercept criterion. A combination of a lower attestation value (e.g., lower than full attestation, including partial attestation, gateway attestation, or no attestation) and other criteria (e.g., neighborhood spoofing criteria) may indicate that the inbound call should be intercepted.

The one or more intercept criteria may comprise one or more conditions associated with the information in the one or more headers. If the information indicates that the sender identifier is unassigned, then the one or more intercept criteria may be satisfied. If the information indicates that the number is within or outside of a geographic area, then the one or more intercept criteria may be satisfied. If the information indicates that the name (e.g., caller ID) matches a pattern (e.g., has certain characters, letters, words), then the one or more intercept criteria may be satisfied.

At step 908, the inbound call may be caused to be intercepted. The inbound call may be intercepted based on the determination that the message satisfies the one or more intercept criteria. Causing the inbound call to be intercepted may cause ringing of one or more of the plurality of termination points to cease. Causing the inbound call to be intercepted may comprise causing simulation of a pick up of the inbound call. The first termination point may cause the interception by sending data indicating the call has been picked up by a user. The data indicating the call has been picked up by the user may comprise a confirmation message, such as a SIP 200 Ok message.

Intercepting the call may comprise connecting the inbound call to an interactive voice response (IVR) service. Intercepting the call may comprise sending a call termination message, such as a SIP Bye message. Intercepting the message may comprise forwarding the call to a voicemail service.

At step 910, data indicative of the interception may be communicated to at least a portion of the plurality of termination points. Sending the confirmation message may cause cancellation of ringing and/or any attempt to establish a communication session one or more termination points. A computing service (e.g., forking service 814, control service 808) receiving the confirmation message from the first termination point may cause sending of a cancellation message (e.g., SIP Cancel message) to one or more of the plurality of termination points (e.g., except the first termination point).

Figure 10:
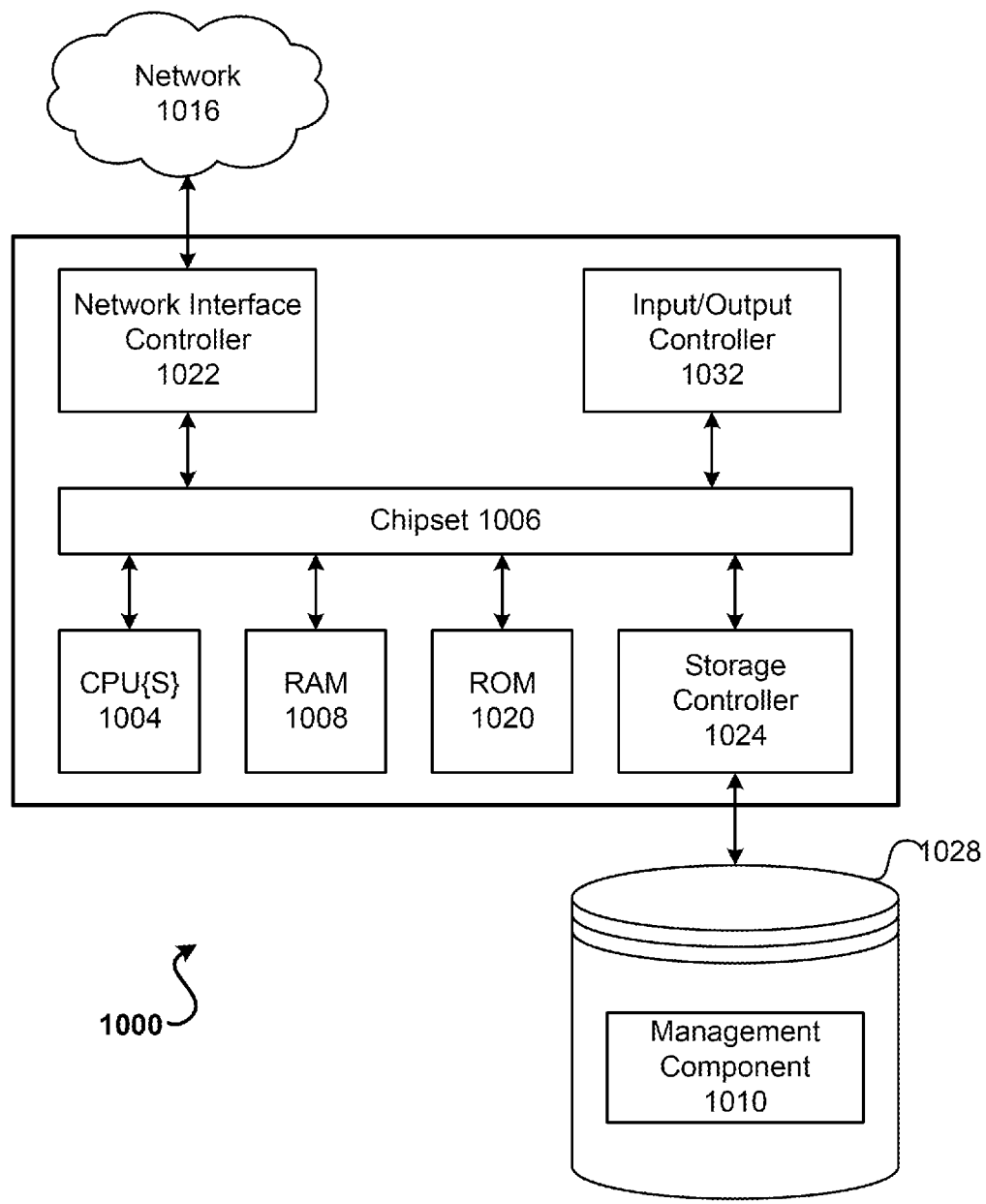
FIG. 10 is a block diagram illustrating an example computing device.

FIG. 10 shows a computing device that may be used in various aspects, such as the servers, services modules, and/or devices depicted in FIG. 1, FIG. 2A, FIG. 2B, FIG. 3, and FIG. 8. With regard to the example devices of FIG. 1, FIG. 2A, FIG. 2B, and FIG. 3, the first network device 110, the second network device 120, the STI-AS 218, the STI-VS 248, the STI-AS 316, and many other elements depicted may each be implemented in an instance of a computing device 1000 of FIG. 10. With regard to the example services of FIG. 8, the border service 802, the screening service 804, the identity service 806, the control service 808, the verification service 810, the TAS 812, the forking service 814, the first termination point, 816, the second termination point 818, the third termination point, may each be implemented in an instance of a computing device 1000 of FIG. 10. The computing device shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement any of the systems and the methods described in relation to FIG. 1, FIG. 2A, FIG. 2B, FIG. 3, FIG. 4, FIG. 5, FIG. 6, FIG. 7, FIG. 8, and/or FIG. 9.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN) 1016. The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on a mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("ID-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform the methods described in relation to FIG. 1, FIG. 2A, FIG. 2B, FIG. 3, FIG. 4, FIG. 5, FIG. 6, FIG. 7, FIG. 8, and FIG. 9.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A method comprising:
   determining, based on a presence or absence of a diversion header associated with a message indicative of a call request, an attestation value indicative of trustworthiness associated with a sender identifier in the message;
   generating, based on the attestation value, a signature; and
   sending, based on a destination identifier in the message, a signed message comprising the signature and at least a portion of the message.

2. The method of claim 1, wherein the message comprises a session initiation protocol invite message.

3. The method of claim 1, wherein the attestation value is one of a plurality of attestation values indicating different levels of trustworthiness.

4. The method of claim 1, wherein generating the signature comprises applying a cryptographic process to at least the attestation value.

5. The method of claim 1, further comprising receiving, at a first device managed by a first service provider and from a second network not managed by the first service provider, the message indicative of the call request.

6. The method of claim 1, further comprising receiving, from a private branch exchange, the message indicative of the call request.

7. The method of claim 1, wherein the sender identifier is associated with a third device, the method further comprising receiving, at a first device and from a second device, the message indicative of the call request, wherein the second device receives the message from the third device.

8. The method of claim 7, wherein the first device and the second device are in communication via a first network and the second device and the third device are in communication via a second network different from the first network.

9. The method of claim 7, wherein the third device is an originator of the message.

10. A device comprising:
    one or more processors; and
    memory storing instructions that, when executed by the one or more processors, cause the device to:
      determine, based on a presence or absence of a diversion header associated with a message indicative of a call request, an attestation value indicative of trustworthiness associated with a sender identifier in the message;
      generate, based on the attestation value, a signature; and
      send, based on a destination identifier in the message, a signed message comprising the signature and at least a portion of the message.

11. The device of claim 10, wherein the message comprises a session initiation protocol invite message.

12. The device of claim 10, wherein the attestation value is one of a plurality of attestation values indicating different levels of trustworthiness.

13. The device of claim 10, wherein the instructions that, when executed by the one or more processors, cause the device to generate the signature comprise instructions that, when executed by the one or more processors, cause the device to applying a cryptographic process to at least the attestation value.

14. The device of claim 10, wherein the device is managed by a first service provider, and wherein the instructions, when executed by the one or more processors, further cause the device to receive, from a second network not managed by the first service provider, the message indicative of the call request.

15. The device of claim 10, wherein the instructions, when executed by the one or more processors, further cause the device to receive, from a private branch exchange, the message indicative of the call request.

16. The device of claim 10, wherein the sender identifier is associated with a third device, and wherein the instructions, when executed by the one or more processors, further cause the device to receive, from a second device, the message indicative of the call request, wherein the second device receives the message from the third device.

17. The device of claim 16, wherein the first device and the second device are in communication via a first network and the second device and the third device are in communication via a second network different from the first network.

18. The device of claim 16, wherein the third device is an originator of the message.

19. A computer-readable medium storing instructions that, when executed, cause:
    determining, based on a presence or absence of a diversion header associated with a message indicative of a call request, an attestation value indicative of trustworthiness associated with a sender identifier in the message;
    generating, based on the attestation value, a signature; and
    sending, based on a destination identifier in the message, a signed message comprising the signature and at least a portion of the message.

20. The computer-readable medium of claim 19, wherein the message comprises a session initiation protocol invite message.

21. The computer-readable medium of claim 19, wherein the attestation value is one of a plurality of attestation values indicating different levels of trustworthiness.

22. The computer-readable medium of claim 19, wherein the instructions that, when executed cause generating the signature comprise instructions that, when executed, cause applying a cryptographic process to at least the attestation value.

23. The computer-readable medium of claim 19, wherein the instructions, when executed, further cause receiving, at a first device managed by a first service provider and from a second network not managed by the first service provider, the message indicative of the call request.

24. The computer-readable medium of claim 19, wherein the instructions, when executed, further cause receiving the message indicative of the call request from a private branch exchange.

25. The computer-readable medium of claim 19, wherein the sender identifier is associated with a third device, and wherein the instructions, when executed, further cause receiving, at a first device and from a second device, the message indicative of the call request, wherein the second device receives the message from the third device.

26. The computer-readable medium of claim 25, wherein the first device and the second device are in communication via a first network and the second device and the third device are in communication via a second network different from the first network.

27. The computer-readable medium of claim 25, wherein the third device is an originator of the message.

28. A system comprising:
a first computing device; and
a second computing device configured to:
determine, based on a presence or absence of a diversion header associated with a message indicative of a call request, an attestation value indicative of trustworthiness associated with a sender identifier in the message;
generate, based on the attestation value, a signature; and
send, to the first computing device and based on a destination identifier in the message, a signed message comprising the signature and at least a portion of the message.

29. The system of claim 28, wherein the message comprises a session initiation protocol invite message.

30. The system of claim 28, wherein the attestation value is one of a plurality of attestation values indicating different levels of trustworthiness.

31. The system of claim 28, wherein the second computing device is configured to generate the signature by applying a cryptographic process to at least the attestation value.

32. The system of claim 28, wherein the second computing device is managed by a first service provider, and wherein the second computing device is further configured to receive, from a second network not managed by the first service provider, the message indicative of the call request.

33. The system of claim 28, wherein the second computing device is further configured to receive, from a private branch exchange, the message indicative of the call request.

34. The system of claim 28, wherein the sender identifier is associated with a third computing device, and wherein the second computing device is further configured to receive, from a fourth computing device, the message indicative of the call request, wherein the fourth computing device receives the message from the third computing device.

35. The device of claim 34, wherein the second computing device and the fourth computing device are in communication via a first network and the fourth computing device and the third computing device are in communication via a second network different from the first network.

36. The device of claim 34, wherein the third computing device is an originator of the message.

* * * * *